United States Patent
Gafford et al.

(10) Patent No.: US 10,642,925 B2
(45) Date of Patent: May 5, 2020

(54) SYSTEM AND METHOD TO FACILITATE CONTENT DISTRIBUTION

(71) Applicant: ViaTech Publishing Solutions, Inc., Dallas, TX (US)

(72) Inventors: Elizabeth Gafford, Dallas, TX (US); Dana Strano, Dallas, TX (US)

(73) Assignee: ViaTech Publishing Solutions, Inc., Dallas, TX (US)

( * ) Notice: Subject to any disclaimer, the term of this patent is extended or adjusted under 35 U.S.C. 154(b) by 52 days.

(21) Appl. No.: 15/836,721

(22) Filed: Dec. 8, 2017

(65) Prior Publication Data
US 2018/0165255 A1    Jun. 14, 2018

Related U.S. Application Data

(60) Provisional application No. 62/431,764, filed on Dec. 8, 2016.

(51) Int. Cl.
*G06F 17/21* (2006.01)
*G06F 17/24* (2006.01)
(Continued)

(52) U.S. Cl.
CPC .......... *G06F 17/212* (2013.01); *G06F 17/241* (2013.01); *G06F 17/243* (2013.01);
(Continued)

(58) Field of Classification Search
CPC .................................................... G06F 17/212
(Continued)

(56) References Cited

U.S. PATENT DOCUMENTS

| | | | | |
|---|---|---|---|---|
| 9,026,900 B1 * | 5/2015 | Pugh | ....................... | G06F 17/24 |
| | | | | 715/227 |
| 2005/0076012 A1 * | 4/2005 | Manber | .................. | G06Q 30/02 |
| | | (Continued) | | |

OTHER PUBLICATIONS

Keraron, Yves, Alain Bernard, and Bruno Bachimont. "Annotations to improve the using and the updating of digital technical publications." Research in Engineering Design 20, No. 3 (2009): 157-170. (Year: 2009).*

(Continued)

*Primary Examiner* — Frank D Mills
(74) *Attorney, Agent, or Firm* — Bell Nunnally & Martin LLP

(57) ABSTRACT

Systems and methods are provided that facilitate publishing, distributing, and reading of electronic content. In some embodiments, the systems and methods may include a document conversion module for converting documents uploaded by publishers into an e-reader friendly format (an e-document). The systems and methods may also include a virtual library for making the e-documents available to end users and an active reader module to allow an end user to download and read the e-documents on an end user device. In some embodiments, the systems and methods may include a user management module for digital rights management and control of end user access to the e-documents. In some embodiments, the active reader may include functionality that allows an end user to annotate the e-document and share comments among users.

10 Claims, 41 Drawing Sheets

(51) Int. Cl.
*G06K 9/18* (2006.01)
*G09B 5/12* (2006.01)
*G09B 7/02* (2006.01)
*G09B 7/077* (2006.01)
*G09B 5/06* (2006.01)
*G06F 21/10* (2013.01)
*G09B 5/02* (2006.01)
*G06K 9/20* (2006.01)
*G06F 17/22* (2006.01)

(52) U.S. Cl.
CPC ............ *G06F 17/248* (2013.01); *G06F 21/10* (2013.01); *G06K 9/18* (2013.01); *G06K 9/2081* (2013.01); *G09B 5/02* (2013.01); *G09B 5/06* (2013.01); *G09B 5/065* (2013.01); *G09B 5/12* (2013.01); *G09B 5/125* (2013.01); *G09B 7/02* (2013.01); *G09B 7/077* (2013.01); *G06F 17/2264* (2013.01); *G06K 2209/01* (2013.01)

(58) Field of Classification Search
USPC ......................................................... 715/223
See application file for complete search history.

(56) References Cited

U.S. PATENT DOCUMENTS

| | | | |
|---|---|---|---|
| 2005/0160355 A1* | 7/2005 | Cragun | G06F 17/241 715/230 |
| 2005/0160356 A1* | 7/2005 | Albornoz | G06F 17/2288 715/229 |
| 2006/0041589 A1 | 2/2006 | Helfman et al. | |
| 2008/0028323 A1* | 1/2008 | Rosen | G06Q 10/10 715/752 |
| 2011/0065082 A1 | 3/2011 | Gal et al. | |
| 2013/0318465 A1* | 11/2013 | Cheng | G06F 3/0483 715/776 |
| 2016/0232143 A1* | 8/2016 | Fickenscher | G06F 16/955 |
| 2017/0060829 A1* | 3/2017 | Bhatt | G06F 17/241 |

OTHER PUBLICATIONS

Young, Lee W., "International Search Report and Written Opinion", prepared for PCT/US17/65439, dated Mar. 6, 2018, 9 pages.

* cited by examiner

SYSTEM AND METHOD TO FACILITATE CONTENT DISTRIBUTION

CROSS-REFERENCE TO RELATED APPLICATIONS

This patent application claims priority to U.S. Provisional Patent Application Ser. No. 62/431,764, filed Dec. 8, 2016, and is incorporated herein by reference.

BACKGROUND

Technical Field

This invention relates in general to the field of electronic publications, and more particularly, but not by way of limitation to systems and methods to facilitate publishing, distributing, and reading electronic content.

Background

The publishing industry has undergone significant changes due to the emergence of digital printing and digital publishing tools. One of the biggest drivers of these changes is the increasing popularity of electronic books ("e-books"). E-books come in a variety of formats, such as EPUB, Mobipocket, PDF, HTML, and .azw, to name a few examples. E-books can be read using a variety of devices, such as dedicated reading devices and general-purpose mobile devices, tablet computers, laptop computers, and desktop computers. Each device includes reading software (an "e-reader") that displays an e-book to a user and enables a user to interact with the e-book. One drawback is that each e-reader is generally specific to a particular device and/or to a particular e-book format.

In a conventional system of publishing electronic documents, an electronic document publishing service prepares an electronic document based on content provided by an author. Oftentimes, the author formats the content, for example, using layout software, and provides the content to the publisher in a format that is not readable by most e-readers. Most of the time, the electronic version that publishers have has a fixed layout (e.g., Portable Document Format (PDF) files). However, most of the e-book formats are Extensible Markup Language (XML)-based and are meant to stream text in an adaptive layout. In order to address the wide range of devices and e-readers, a publisher often creates an e-book version in a plurality of different formats. One format that has become widely adopted because it can be read on many different e-readers in the iOS and Android environments is the EPUB file format.

The EPUB file format is a free and open standard designed for reflowable content such that the text display can be optimized for the particular display device. However, publishing content in the EPUB file format requires professionals to convert each page of a document from a source file (InDesign, Word, PDF, etc.) into the EPUB format. This is a time consuming, clumsy, and expensive process. Digital content creators with high quantities of revisions have to reconvert their entire document each time a revision is made, which increases publication costs exponentially. Thus, many publishers remain reluctant to publish their materials in this format due to the costs of converting such materials into the EPUB format. Another concern many publishers have is that many e-reader formats do not have sufficient security and digital rights management controls. For example, many conventional e-reader formats do not have a means of protecting the author's copyright in the document, such as limiting further distribution after the document is downloaded. Digital content needs to be secure and consumed universally while still offering general e-reader functionality.

In addition to the cost and security concerns of publishers, many consumers have complained that reading digital content on an e-reader is not as enjoyable as reading printed versions of the content for a variety of reasons, including the inability to annotate the digital content. Being able to make annotations, such as highlighting, underlining, and making notes in the margins of physical books, can enhance the reading experience. Another drawback of conventional e-book formats is that many provide a continuous stream of text rather than discrete pages of content. The reading experience is diminished when the electronic version of a book is not true to the non-electronic version in both content and layout. For example, page settings and text structure elements such as paragraphs, headers, image layouts, and chapter breaks in the electronic version should be the same as they are in the non-electronic version. Conventional solutions for converting from a fixed layout are burdensome and not entirely user-friendly. For example, a book may be converted from a PDF file into a draft HyperText Markup Language (HTML) file, which is then edited manually to correct aspects of the HTML draft such as pagination and formatting. This type of editing can be difficult, and also requires the editor to be trained to work with such a file. A large amount of work and expense is required to convert the document file into an e-reader friendly format. As a result, even when an author who has prepared a document file wants to publish this book as an electronic document, the author may abandon this desire simply due to the complexity and expense of converting the document into an e-reader friendly format.

Digital images are displayable on almost all e-readers. Therefore, one solution that has been implemented in the past is to convert each page of a document into a digital image. Digital images are typically stored as raster images, also referred to as bitmap images. Examples of formats that are raster based include JPEG, GIF, BMP, PNM, TIFF, PPM, PNG and many others. Raster images are generally defined to be a rectangular array of regularly sampled values, known as pixels. Each pixel (picture element) has one or more numbers associated with it, generally specifying a color which the pixel should be displayed in. Although digital images may be true to the pagination and formatting of a source document, digital images lack many of the features users desire when reading an electronic document on an e-reader, such as the ability to make annotations.

Therefore, a tool that reduces the costs and complexity of converting documents to a format displayable on most e-readers while maintaining many of the features readers desire would be valuable.

SUMMARY OF THE INVENTION

According to various embodiments of the invention, a system is provided for publishing and displaying digital content. In some embodiments, the system may include a document conversion module for converting documents uploaded by publishers into an e-reader friendly format (an e-document). The system may also include a virtual library for making the e-documents available to end users and an active reader module to allow an end user to download and read the e-documents on an end user device. In some embodiments, the system may include a user management module for digital rights management and control of end user access to the e-documents. In some embodiments, the active reader may include functionality that allows an end user to annotate the e-document. In some embodiments, annotations and comments may be shared among users. In some embodiments, the virtual library and/or active reader may allow users to run text-based searches of the e-documents for content that matches user search terms.

Further embodiments of the invention are directed towards methods of implementing the above-described system and computer executable program code configured to cause one or more computing devices to perform steps of the methods. In some embodiments, the active reader may be a downloadable software application that can be installed on a user device, such as an e-reader, smartphone, laptop, or tablet computer. In some embodiments, the method may include a publisher remotely uploading a document onto a server and then converting the uploaded document into an e-document. Next, the e-document may be made available in a virtual library for end users to download. In some embodiments, the active reader method may allow a publisher to limit access to the virtual library to only authorized users or to limit access to certain e-documents within the virtual library to a subset of users having access to the virtual library.

In accordance with the present invention, a system and method to facilitate content distribution is shown. In accordance with one aspect of the present invention, the active reader conversion software converts source documents from a first file format, such as PDF files, EPUB files, and word processing documents, into a second file format. According to some embodiments, a "document" can encompass any form of electronically displayable information including, but not limited to, books, manuals, reference materials, picture books, and so on. In some embodiments, the source files are converted into a series of images, such as stacked JPEGs, where a JPEG is created for each page of the source document. A database of vectored images may also be created and associated with each image. In some embodiments, text is extracted from the images using an Optical Character Recognition (OCR) process. The active reader application may then display the stack of JPEGS in a document window that fetches the metadata from each version of the JPEG and reconfigures the stack as a new image.

In various embodiments, the active reader system may provide a method and apparatus for allowing a user to add annotations and other markings to an e-document independently of the content of the document. According to one variation of the invention, an e-reader, such has a mobile phone or tablet computer, may have an active reader application that permits a user to annotate e-documents that are viewed through a document browser. The annotations may be stored in a separate file from the image of the document page being viewed, but may be correlated with the image of the page such that when a previously annotated page is revisited, annotations relating to that page are retrieved and displayed over the image of the page in a canvas or ink layer. In some embodiments, an end user may annotate an e-document without corruption of the underlying images of the pages of the e-document. In some embodiments, to create an annotation, a user can select a location in the page of the e-document being viewed where the annotation is to be placed. The user can add an annotation while reading the e-document. Annotations may include, but are not limited to, bookmarking, highlighting, making textual notes, drawings, doodles, arrows, underlining, strike-throughs, audio recordings, video recordings, and the like. In some embodiments, the annotations may be filtered, navigated, sorted, and indexed per user input. As the user creates annotations on the canvas layer overlaying the image (e.g., the JPEG) that is displayed in the document window at the time of viewing, the metadata is vectored and stored in a database to sync the updated JPEG stack corresponding to that image. While the annotations can be displayed in conjunction with the e-document, the underlying images of the e-document may remain unmodified. In accordance with some embodiments, to associate an annotation with a selected location, the annotations can be linked to a location in the unmodified JPEG and the location and annotations stored in a separate, linked file, such as a write-enabled portion of the file.

In various embodiments, the present invention may provide an e-document rendered from a source document in any file format, where the e-document has the functionality of the EPUB file format, the original content layout of the source document, and is viewable on standard e-readers, including iOS and Android devices, as well as web browsers.

In one embodiment, a computer-implemented method of creating an electronic workbook is provided, the method comprising: receiving a source document in a first format, the source document having a layout comprising content and form fillable data fields disposed at locations in the source document; converting the source document to a second format to generate an electronically fillable e-workbook that replicates the layout of the source document, the converting comprising: generating a digital image of a page of the source document; determining the locations of the form fillable data fields on the page; generating a transparent canvas layer linked to the digital image and dimensioned to overlay the digital image; and defining a plurality of modifiable regions on the transparent canvas layer, the modifiable regions having a one-to-one correspondence with the form fillable data fields on the page; and storing the e-workbook in a database, wherein the digital image is stored separately from the modifiable regions. The method further comprising: displaying the e-workbook on a display device wherein the digital image and the transparent canvas layer are displayed simultaneously on the display device; receiving client data indicating a user input in one or more of the modifiable regions within the transparent canvas layer overlaying the digital image; and storing the received client data in a file associated with the user. The method further comprising: electronically distributing the e-workbook to a plurality of users; receiving data from the plurality of users indicating each user's input in the modifiable regions of the e-workbook; and storing the received data separate from the e-workbook. The method described above wherein the first format is a portable document format and the second format is a Joint Picture Expert Group format, or wherein the converting the source document to the second format includes automatically detecting the form fillable data fields on the page. The method may also include wherein the determining the locations of the form fillable data fields on the page includes identifying a blank space on the page as a form fillable data field.

In another embodiment, a computer-implemented method for creating electronic workbooks is provided comprising: receiving a source document having a plurality of form fillable objects disposed at locations in the source document; generating a digital image of a page of the source document; scanning the page of the source document to determine the locations of the form fillable objects in the page of the source document; generating a transparent canvas layer dimensioned to overlay the digital image, the transparent canvas layer having a plurality of bounded modifiable regions disposed at positions on the transparent canvas layer, the positions being correlated to the locations such that, when the digital image is displayed on a display device, the digital image visually replicates the page and the plurality of bounded modifiable regions functionally replicate the plurality of form fillable objects; and storing the digital image in a first file and the transparent canvas layer in a second file linked to the first file, wherein, in response to a request from a user for the digital image, the first file is provided to the user in an unmodifiable format and the second file is provided to the user in a modifiable format. The method of creating electronic workbooks further comprising: displaying the digital image on a user interface with the transparent canvas layer superimposed over the digital image; receiving client data indicating a user input in one or more of the bounded modifiable regions within the canvas layer overlaying the digital image; and storing the received client data in a third file associated with the user. The method of creating electronic workbooks further comprising: electronically distributing the first file and second file to a plurality of users; receiving data from the plurality of users indicating each user's input in the bounded modifiable regions; and storing the received data separate from the first file and the second file. The method of creating electronic workbooks may also include, wherein the source document is a test having questions and the form fillable objects are spaces for providing answers to the questions.

In another embodiment, a computer-implemented method of annotating pages of an electronic document is provided, the computer-implemented method comprising: converting a source document in a first format into an electronic document in a second format, wherein the converting comprises: generating a plurality of linked digital images corresponding to pages of the source document; performing optical character recognition (OCR) on the plurality of linked digital images to generate a text file that includes recognized text corresponding to text included in the source document; correlating the recognized text with corresponding locations in the digital images; and generating a plurality of transparent canvas layers, each transparent canvas layer being linked to a digital image of the plurality of digital images and being dimensioned such that the transparent canvas layer can be superimposed over the linked digital image when displayed; in response to a request from a user to view a page of the electronic document, displaying on a computer display a digital image corresponding to the page of the electronic document overlaid with the transparent canvas layer linked to the displayed digital image; detecting a selection of an annotation mode that permits the user to annotate the currently displayed digital image; receiving a first annotation input from a user input device indicating that the user has made a first annotation to the currently displayed image; storing the first annotation as a first object on the transparent canvas layer, wherein the transparent canvas layer containing the first annotation is stored in a first annotation file as a first canvas layer; receiving a second annotation input from the user input device indicating that the user has made a second annotation to the currently displayed image; and storing the second annotation as a second object on the transparent canvas layer, wherein the transparent canvas layer containing the first annotation and the second annotation is stored in a second annotation file as a second canvas layer. The computer-implemented method may further comprise: in response to a user request to undo the second annotation, removing the second canvas layer from the computer display and displaying the first canvas layer in the computer display, or wherein the source document is one of an HTML file, a PDF file, or a native word processing application file, or wherein the digital images are JPEG files and the transparent canvas layer is a bitmap image. The computer-implemented method may also include wherein the first annotation is one or more of an image annotation, a voice annotation, a video annotation, a structured text annotation, a free hand text annotation, a free hand sketch annotation, and an audio annotation, or wherein the first annotation file contains a user identifier associated with the user, or wherein in response to the request from the user to view the page of the electronic document, the annotation database is checked for any annotation files associated with the user.

The above summary of the invention is not intended to represent each embodiment or every aspect of the present invention. Particular embodiments may include one, some, or none of the listed advantages.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

The present invention is directed towards systems and methods for publishing and displaying digital materials. In various embodiments, systems and methods are provided for converting an electronic document from any file format into a format that preserves the original content layout of the source document when viewed on an e-reader. In further embodiments, the system provides an e-reader application that allows users to add annotations to the e-document through tools such as highlighting, bookmarking, and taking notes. In various embodiments, the annotations may be saved and available for the user to access at a later time. In various embodiments, systems and methods are provided for electronic delivery of e-documents to users that provides both flexibility and portability for the user while also maintaining the ability of a content publisher to manage the digital rights of such e-documents. An additional aspect of the systems and methods for publishing and displaying digital materials set forth herein includes a reduction in the expense and time required to make revisions to electronically published content.

Figure 1:
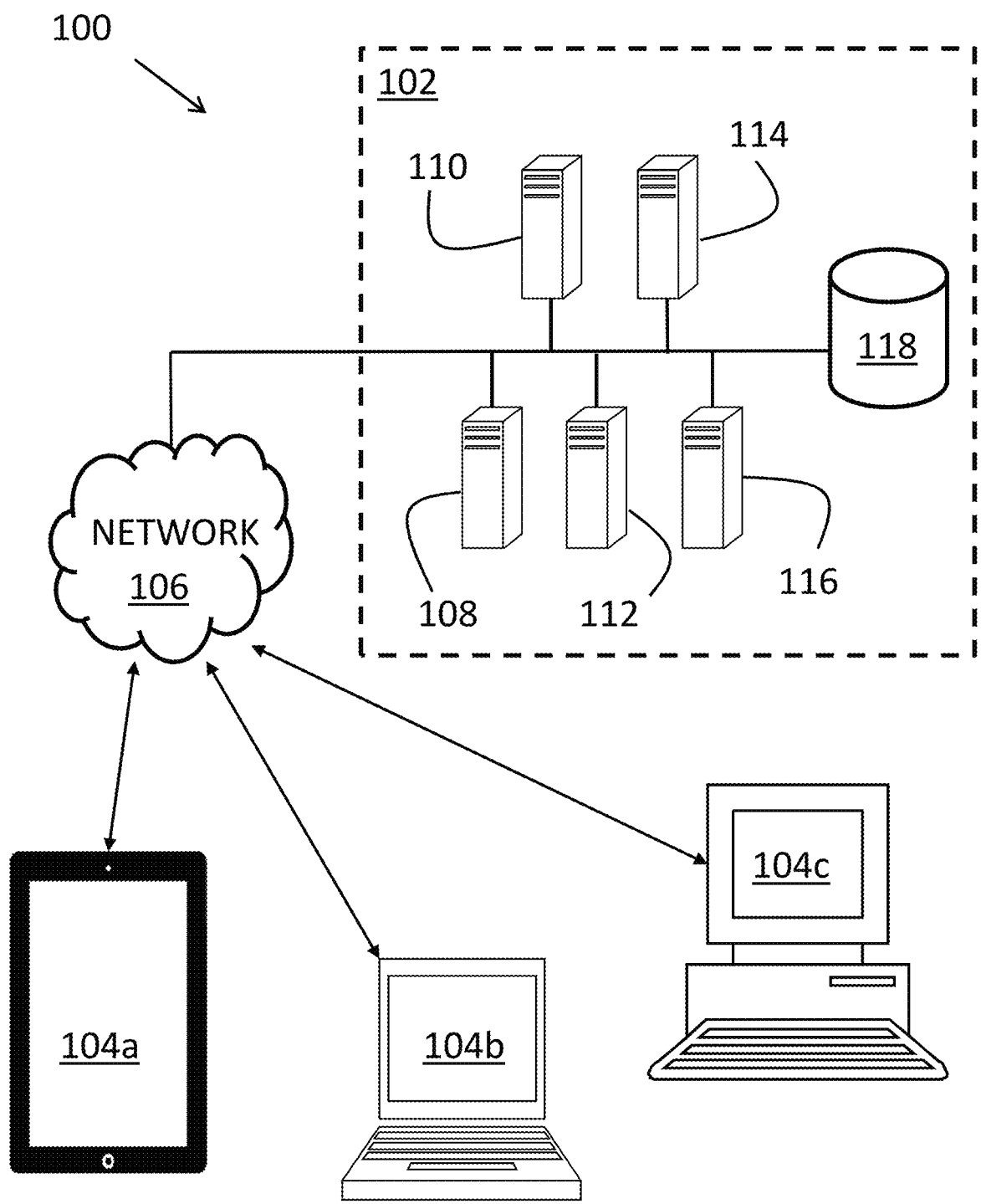
FIG. 1 is a diagram of an active reader system according to one embodiment of the present invention.

Referring now to FIG. 1, a schematic diagram according to an example embodiment is shown illustrating a computer network system 100 having a client-server architecture. The computer network system 100 includes an electronic document publishing system 102 and one or more client computers 104*a*-*c*, communicatively coupled via a network 106. In an embodiment, the electronic document publishing system 102 includes a web server 108, an application server 110, a messaging server 112, a database management server 114, a file server 116, and a storage device 118. The electronic document publishing system 102 may be implemented as a distributed system. For example, one or more elements of the electronic document publishing system 102 may be located across a wide-area network from other elements of the electronic document publishing system 102. As another example, a server may represent a group of two or more servers, cooperating with each other, in providing a pooled, distributed, or redundant computing model. Moreover, those skilled in the art will appreciate that one or more embodiments may be practiced with any number of computer system configurations including, but not limited to, where program modules may be located in local and/or remote memory storage devices.

The client computers 104*a-c* may include electronic devices in various forms, such as a mobile communication device 104*a* (e.g., a PDA, a smart phone, a tablet computer, etc.), a laptop computer 104*b*, a desktop computer 104*c*, or other devices capable of network communication and visual presentation. In addition, the client computers 104*a-c* may include a thin-client, a thick-client, a fat client, a hybrid client, or other client model typically found in a client-server architecture. The network 106 may include local-area networks (LAN), wide-area networks (WAN), wireless networks, the Internet, or other combinations or permutations of network protocols and network types. The web server 108, either alone or in conjunction with one or more other computers in the electronic document publishing system 102, may provide a user interface.

In an embodiment, client computer 104*c* may be an administrative user. During operation, the admin user may access the electronic document publishing system 102 to upload content to be published to users. The electronic document publishing system 102 may then convert the uploaded content from a first format into an e-document format. The admin user may then request that the e-document be published to a virtual library to allow authorized user access to the e-document.

In an embodiment, the client computer 104*a* may include a client program (e.g., a rendering program or rendering module) to interface with the electronic document publishing system 102. The client program may include commercial software, custom software, open source software, freeware, shareware, or other types of software packages. The client program may interact with a server program hosted on a server of the electronic document publishing system 102. During operation, a user at a client computer 104*a* can access the electronic document publishing system 102 to view an e-document. The e-document may be downloaded to the client computer 104*a* or may remain in the electronic document publishing system 102 and viewed remotely.

While the system 100 shown in FIG. 1 employs a client-server architecture, the present invention is of course not limited to such an architecture, and could equally well find application in a distributed, or peer-to-peer, architecture system, for example. Additionally, while various computers and storage devices are illustrated as separate components in FIG. 1, it is understood that functionality of these components may be merged, distributed, or otherwise organized into different configurations, depending on the implementations due to design preferences, cost restrictions, geographical limitations, or other business, technical, or practical considerations.

Active Reader File Conversion

In various embodiments, after an admin user at client computer 104*c* uploads a source document to the electronic document publishing system 102, the source document is converted into an active reader file format. One embodiment of a process by which pages of the uploaded content can be converted into an e-document format and published in the virtual library are described below. In various embodiments, an image of each page of the content is acquired. Image acquisition can be performed using methods known in the art, such as scanning printed pages or converting from a first file format, such as a word processor or PDF, into an image file. In some embodiments, the image acquisition process may include recognizing locations in a document where annotations from a user are intended to be located. For example, when converting from a form-fillable PDF, the image acquisition process may identify any form fields located within the document and record the location of those form fields. In some embodiments, the image acquisition process may automatically detect regions within the document having certain characteristics and identify them as form fields, such as a blank within a sentence of a workbook for a student to fill-in or bubbles in a multiple choice exam. In some embodiments, an admin user, such as a teacher, may add form fields at a later time and those form fields will be associated with a desired page and/or location in the e-document. In some embodiments, form fields may be transferred among versions of the e-document and/or to new e-documents. In some embodiments, each page of content is converted into a JPEG image file format using file conversion software. For example, conversion software such as "Aspose.Words" (Aspose Pty Ltd. of Sydney, Australia) or any other similar application can be utilized.

For each page of content, a JPEG image is created. In addition, a canvas layer may be created for each JPEG image. The canvas layer consists of a drawable region defined in HTML code with height and width attributes. The height and width attributes may be set to the height and width of the JPEG image. As described in more detail below, the active reader application may access the canvas area to allow a full set of drawing functions, thus allowing for dynamically generated graphics. For example, the canvas layer may enable annotations entered by a user while viewing the JPEG to be recorded and stored without modifying the underlying JPEG image.

For each page of content, a recognition routine, such as optical character recognition (OCR), may be performed to identify the text of each word on the page. In some embodiments, the OCR routine may be run on the pages of the source document or may be run on the image obtained from the source document. It should also be understood that a "word" encompasses any grouping of one or more characters, numbers, or symbols. OCR routines, such as the TESSERACT engine, are well known in the art of electronic document processing. The resulting text information obtained from each page may then be stored in a text searchable database associated with the page from which it was obtained. The text searchable database may be organized as desired, preferably using data structures optimized for full text searching. In one suitable embodiment, each word in the text searchable database has associated therewith content identification numbers and page numbers corresponding to images in the page image database where the particular word is found. In various embodiments, the location of the text is also captured during the OCR process, such that locations in the image of the page from the source document can be associated with words in the text database and words in the text database can be associated with locations in the page image.

In various embodiments, after conversion of a multi-page source document to an e-document, the resultant e-document consists of a plurality of linked JPEG files, where each JPEG file corresponds to a page of the source document. In various embodiments, each JPEG file includes a JPEG image of a page of the document, a canvas over layer, and metadata associated therewith containing, among other things, the OCR text from the page.

E-Commerce Platform

Figure 2:
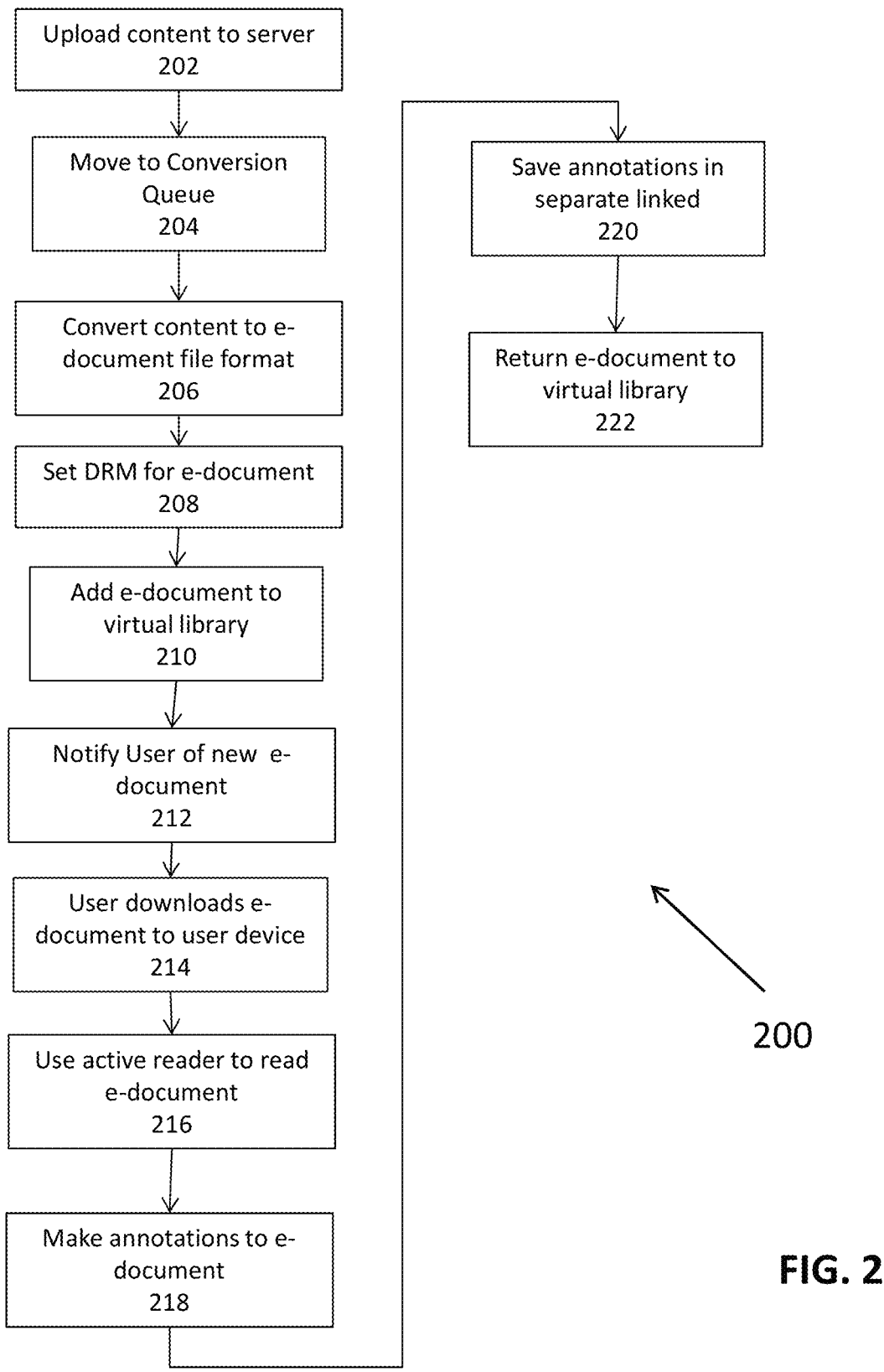
FIG. 2 is a flow chart of a method of operation of an active reader system according to an embodiment of the present invention.

Referring now to FIG. 2, a flowchart is provided of an embodiment of a method 200 for implementing an active reader marketplace to facilitate the publication of content to a desired set of users in a format viewable by most standard computing devices. Beginning at step 202, an author of content, such as an individual or company, can upload content in any format to a digital asset repository. At step 204, the entity uploading the content may request that the content be prepared for publication. Next, if the document is not already in an active reader e-document format, the content may then be converted into an active reader e-document at step 206. After conversion, digital rights management (DRM) settings provided by the uploader may be applied to the e-document at step 208. At step 210, the e-document, containing the DRM settings, may then be added to the e-commerce platform for distribution to end users.

In various embodiments, the active reader e-document standard allows for DRM. DRM comprises access control technology that may be employed to impose limitations on the access and use of digital content. Users may be restricted in what they can access and download and whether or not they can save, print, and/or send content. In various embodiments, the e-commerce platform facilitates DRM of the e-documents contained in the virtual library. For example, access rules may serve to limit the e-documents that can be viewed by a user based on an identification of the user. A log in or registration routine may be employed to identify a user. In some embodiments, end users are required to login prior to viewing any content contained in the virtual library. A virtual library may be associated with a single company and only employees of that company may be allowed to access e-documents contained in that virtual library. In addition, time limits may be added into the metadata associated with the e-document, such that an e-document becomes inaccessible once the time limit has expired.

Referring again to FIG. 2, at step 212, end users may be notified that new content has been added to the virtual library associated with the publisher of the content, such as by email or within the active reader application when the user next logs in. In various embodiments, at step 214, an end user desiring to read the content may access the virtual library using a standard internet browser and/or may be prompted to download an active reader application onto that user's computer or personal mobile device, such as a smartphone or tablet. Once the end user has been authenticated, the end user may view the content and/or download the e-documents to the end user's mobile device for viewing using an active reader application at 216. At step 218, the user may make annotations to the e-document, which are then saved apart from the actual JPEG image at step 220. In some embodiments, a single e-document may be stored in the virtual library and accessible by a plurality of users. The annotations of each user may be stored in a separate folder apart from the e-document. When a user downloads the e-document, the active reader application may look for annotations and/or form fields associated with that e-document and provide any that the user is authorized to view. At step 222, the e-document is either deleted from the e-reader or is returned to the virtual library. In some embodiments, an authorized user may download an e-document into the active reader application on that user's mobile device and may then view that e-document for a predetermined amount of time. At the end of that time period, the active reader application automatically deletes the e-document and/or renders that e-document inaccessible. If the e-document is to be returned to the virtual library and the user is not connected to the internet, the active reader application may wait until an internet connection is reestablished and then transfer the e-document back to the virtual library. In various embodiments, an admin user may be able to remotely delete an e-document from a user's mobile device. In some embodiments, an admin user may be able to delete an e-document from the virtual library and allow the e-document to remain on the user's mobile device until the expiration of a predetermined time.

FIG. 2 shows a flowchart indicating various steps that can be executed to provide the document conversion and publication functions according to one embodiment. It will be appreciated that many different approaches for carrying out the inventive principles are possible, and the steps shown are intended to be exemplary only. For example, although the steps are illustrated as being performed sequentially, they can in fact be performed by different components at different times.

Figure 3:
FIGS. 3-41 are wireframes illustrating an electronic workbook of one embodiment of the present invention.
Figure 4:
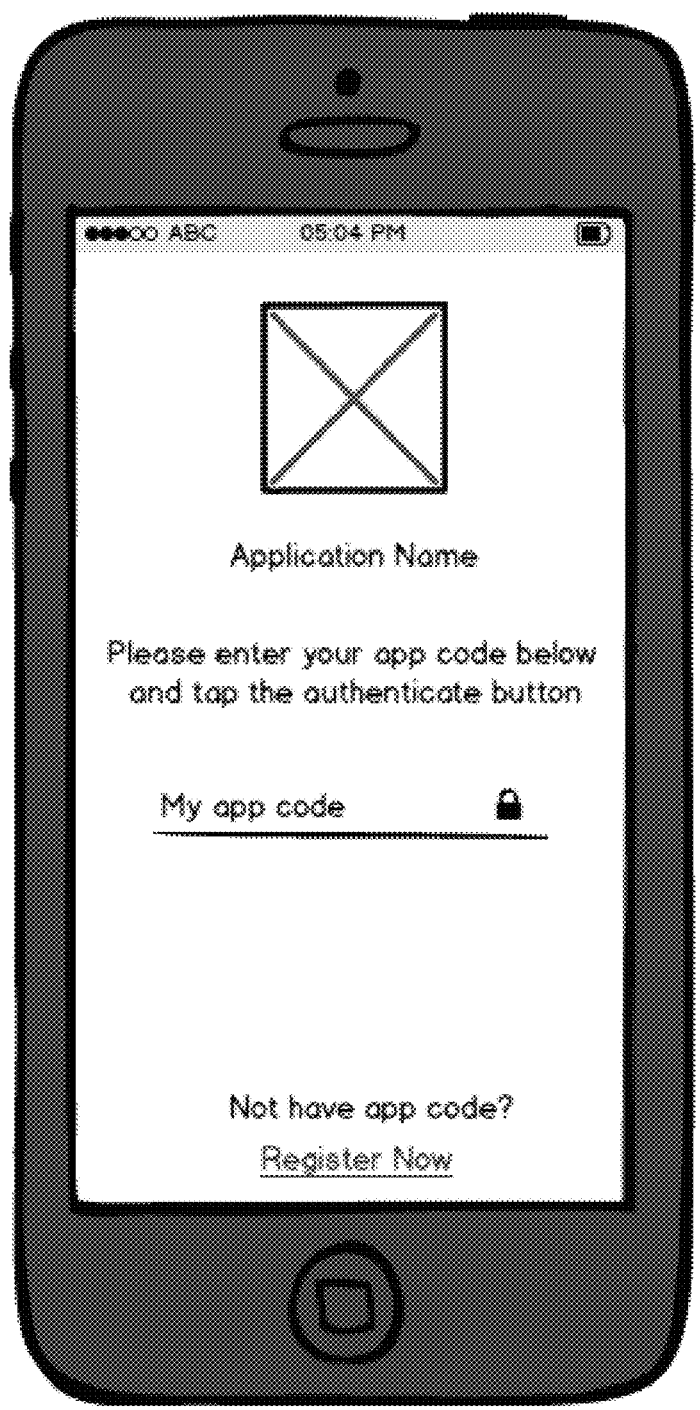
Figure 5:
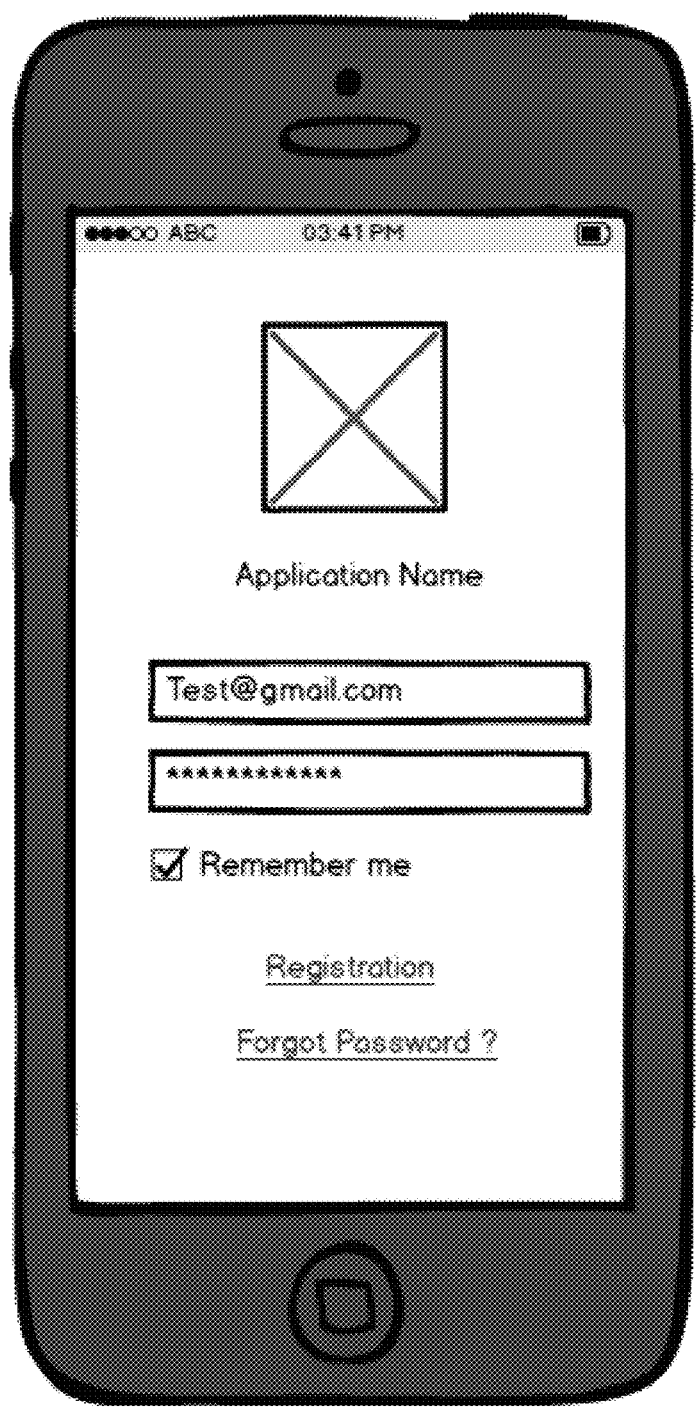
Figure 6:
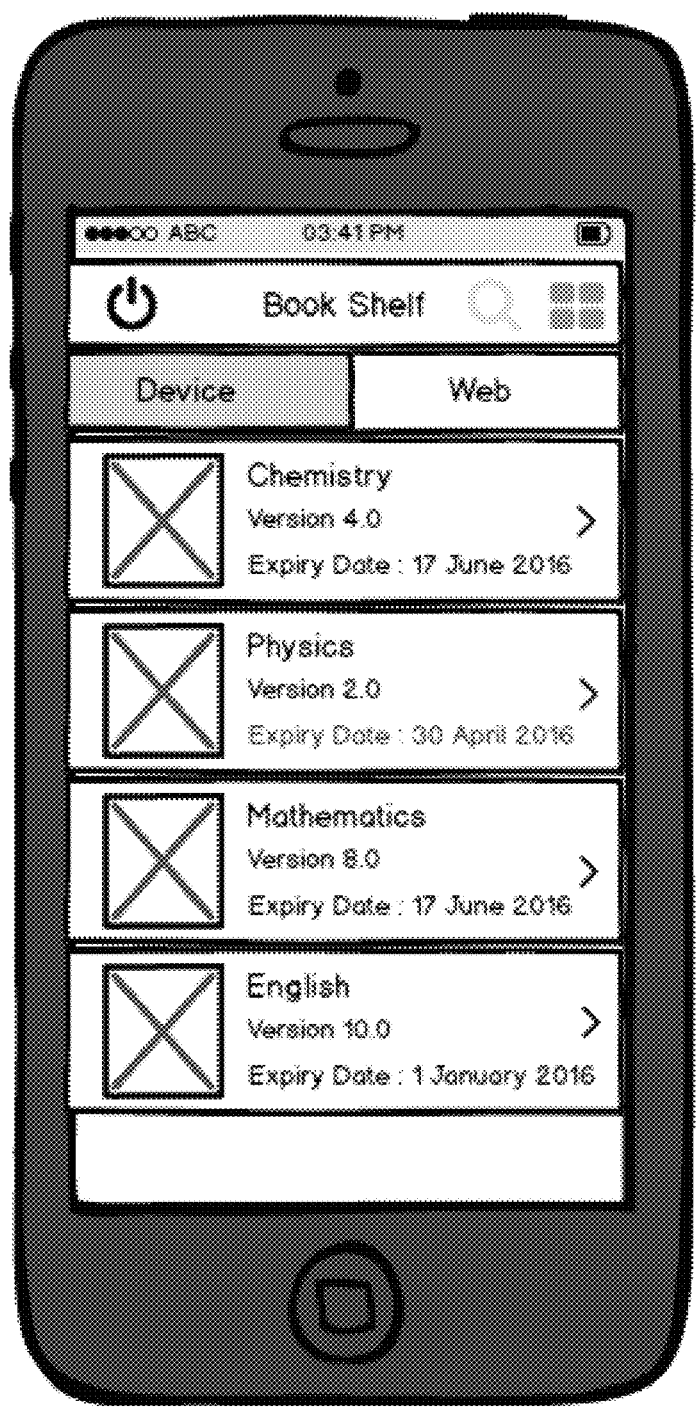
Figure 7:
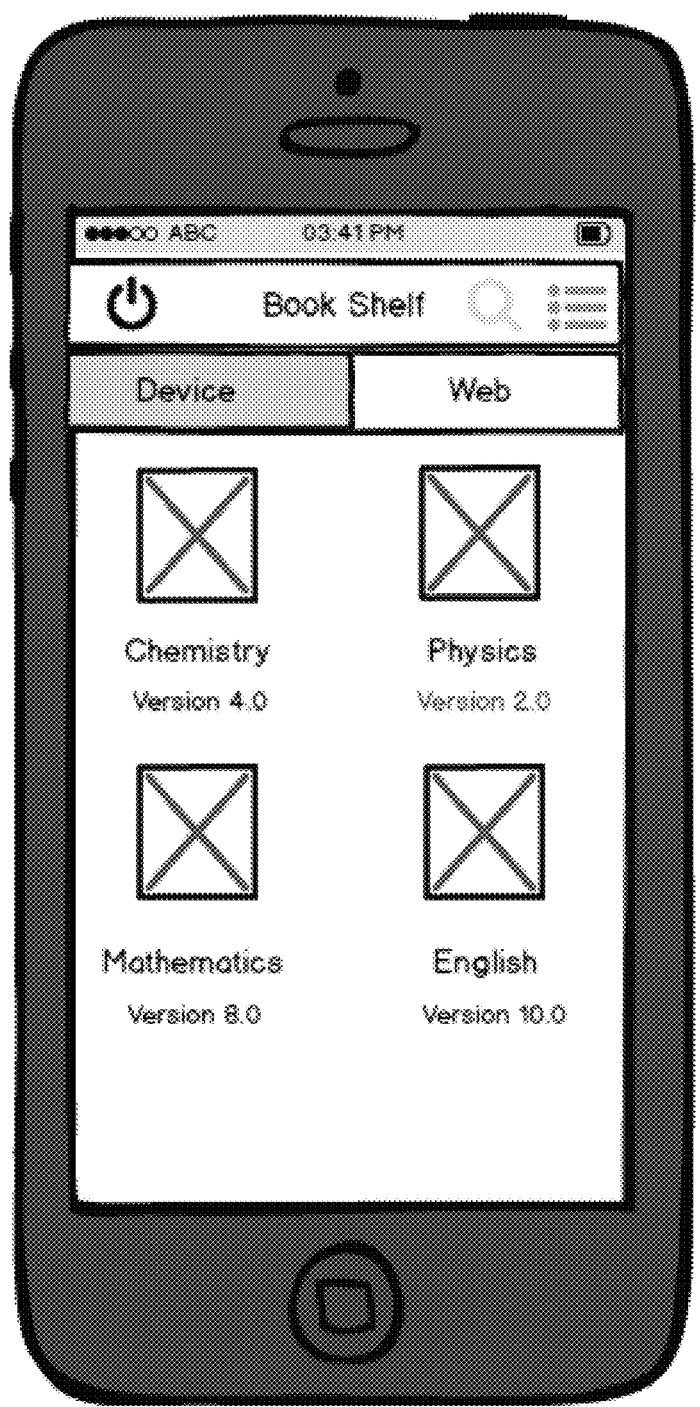
Figure 8:
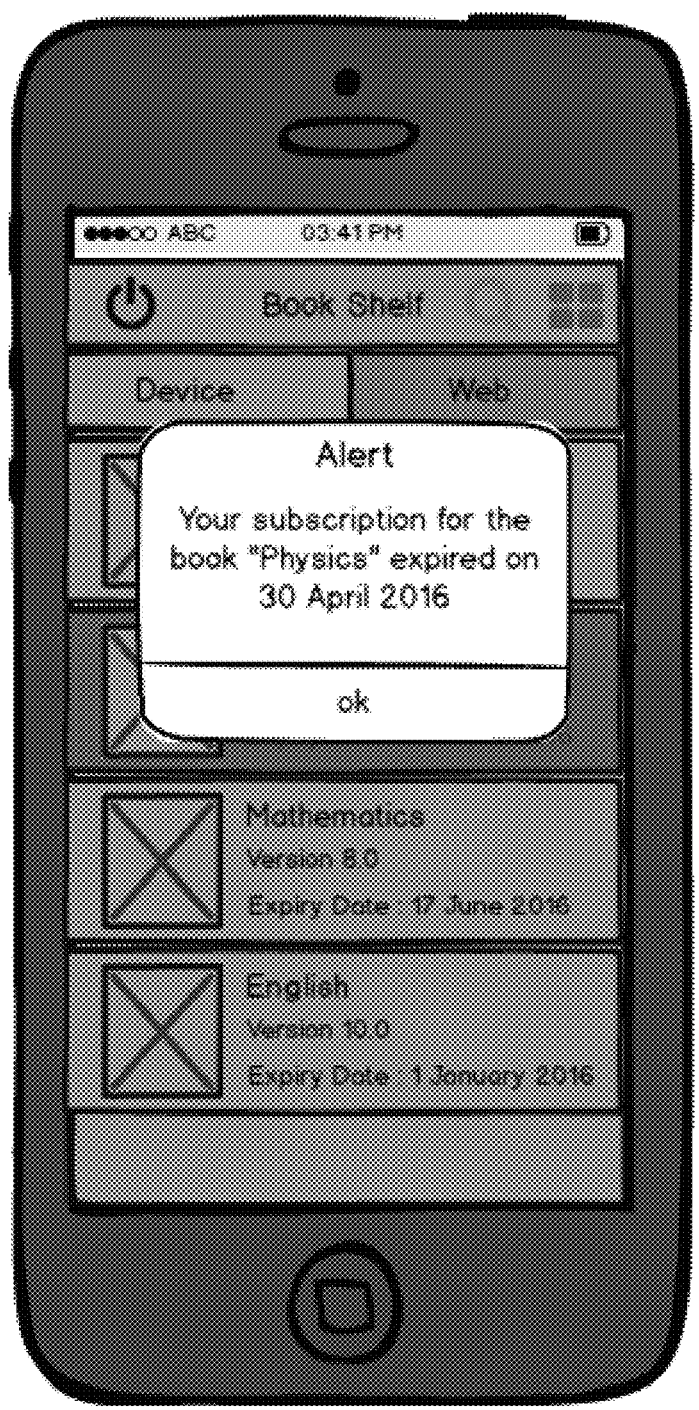
Figure 9:
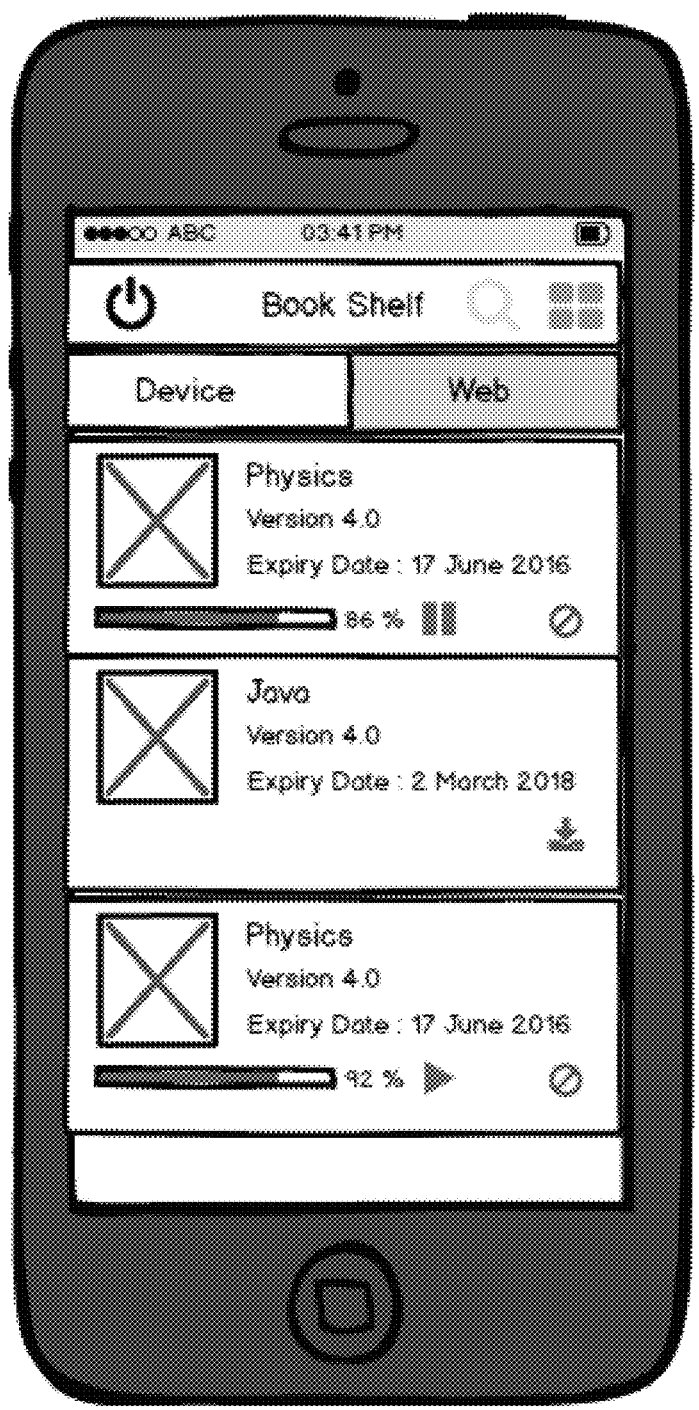

FIG. 3 is a conceptual view showing a user interface of a user's mobile device, such as a smart phone, on which an icon appears for downloading the active reader application. In some embodiments, the application may be privately labeled with the name of the company associated with a particular virtual library. In some embodiments, as can be seen in FIG. 4, a user may be required to enter a code prior to downloading the application. Once downloaded onto the user's mobile device, a user is required to input a login name and password to authenticate the user, as shown in FIG. 5. After the user has been authenticated, the user is directed to the Book Shelf associated with that particular user, as shown in FIG. 6. FIG. 7 shows a slightly different layout of a user interface of a Book Shelf. As shown in FIG. 8, the user may be notified of recent activity, such as the expiration of a particular e-document or the availability in the virtual library of a new version of an e-document. As discussed in more detail below, annotations made to a first version of a document may be transferable to new versions of that same document. In some embodiments, only annotations associated with pages that are unaltered between a first version and a second version may be transferable. In various embodiments, a download percentage indicator may be included, as can be seen in FIG. 9.

Figure 10:
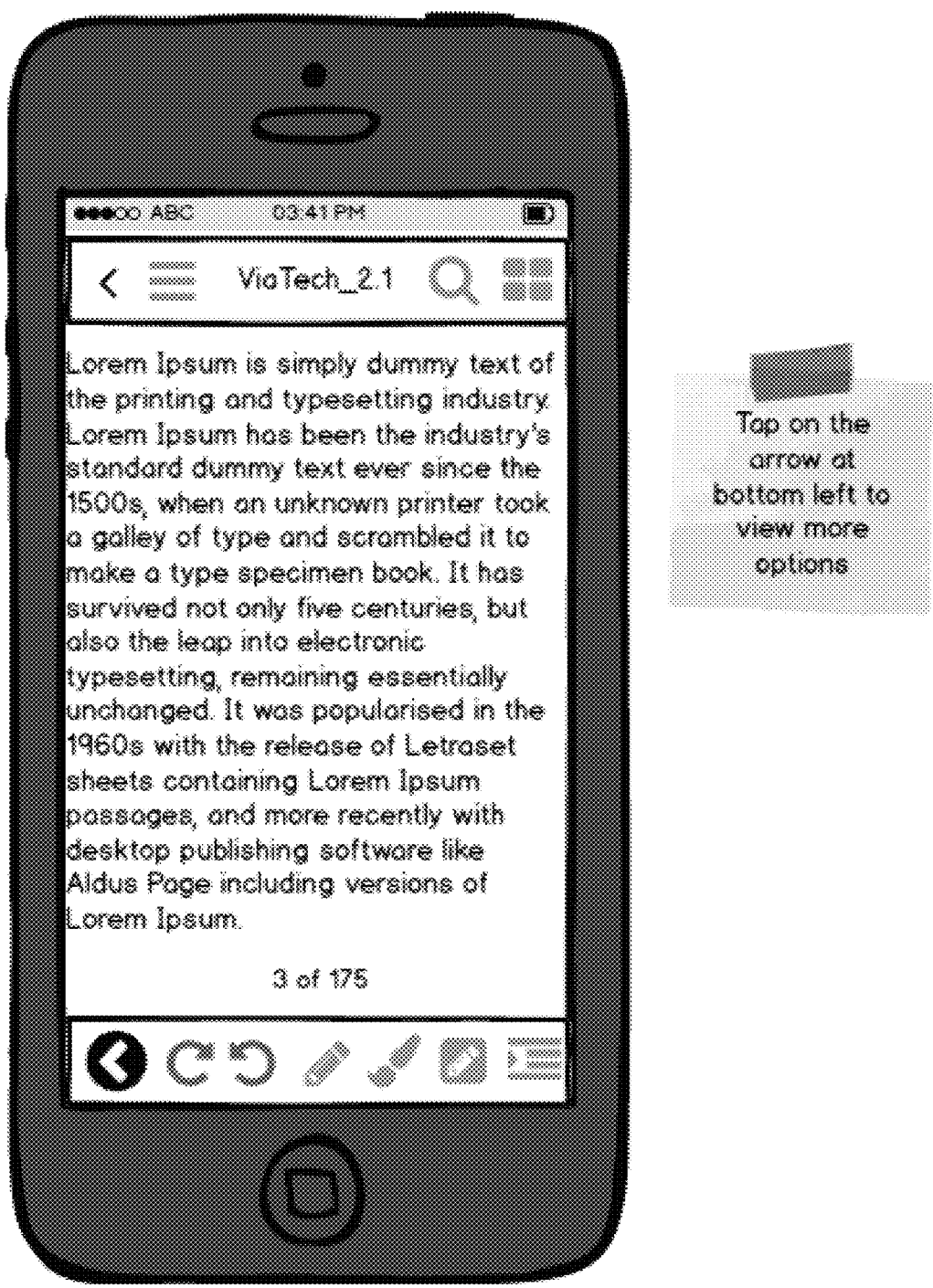

In FIG. 10, a page of an e-document is displayed within the active reader application. As is conventional, the document page contains text and/or graphics of interest to the user. In accordance with various embodiments, a transparent canvas or ink layer has been superimposed over the document page. By selecting one of the tools at the bottom of the screen, the user can highlight certain parts of the document, which are then shown in a highlighted color (e.g., yellow) against the background text. The user can mark annotations on the display screen, which appear to be written on the page itself. Although the canvas layer is a separate, transparent JPEG overlay on top of the image of the page of the e-document, the user would see only the e-document page with annotations superimposed over the text and/or graphics of the page. According to one aspect of the invention, annotations made by a user on a document page are maintained as a separate layer that is only superimposed over the document page and not combined with the actual page image file. Consequently, even though the annotations appear to be made directly on the underlying document, they are actually maintained in a separate transparent layer. In other embodiments, the annotations may be combined with the actual page image file.

Figure 11:
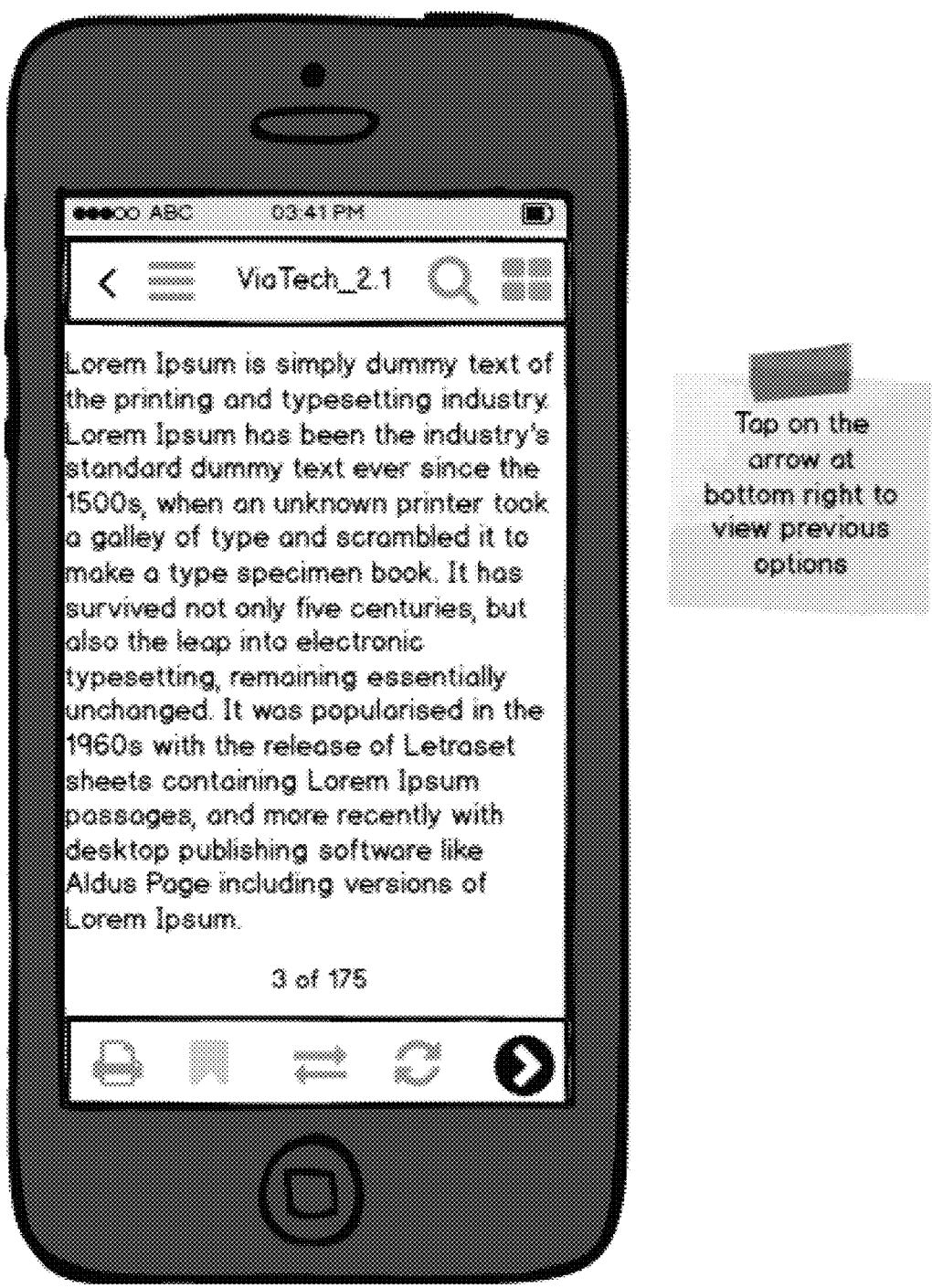
Figure 12:
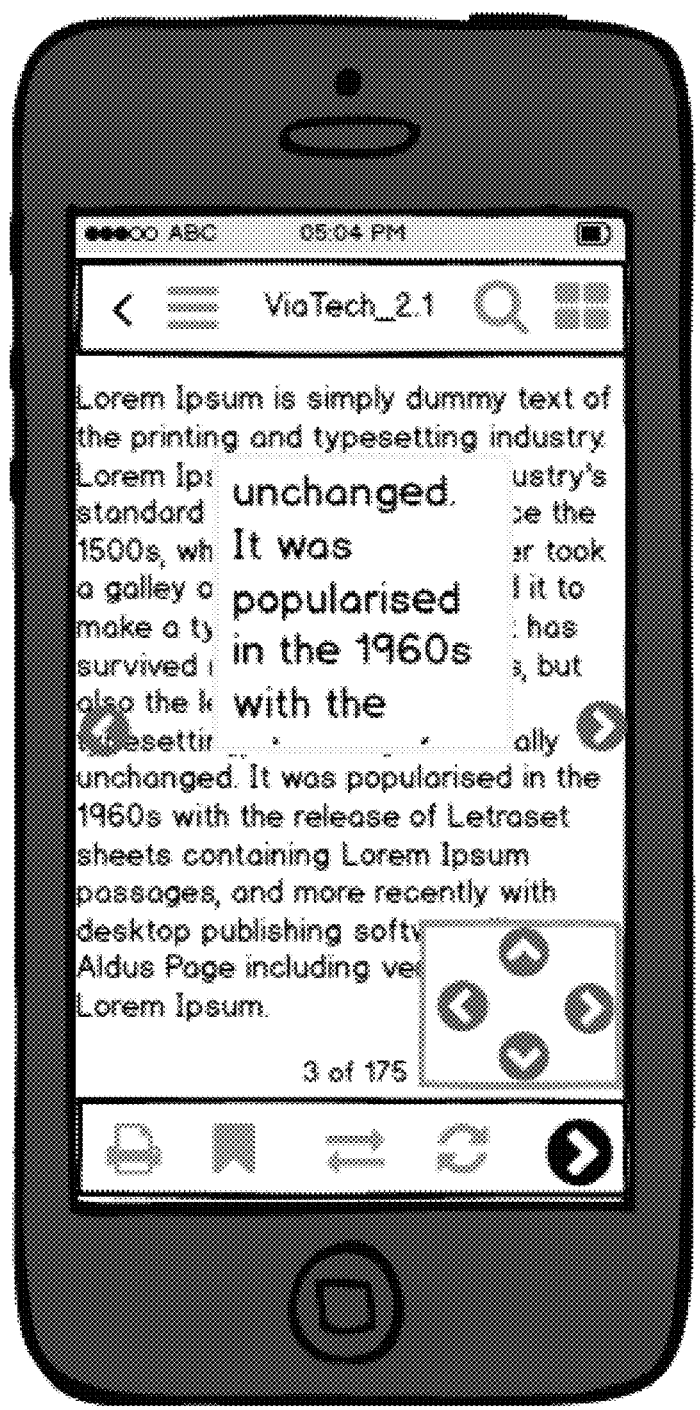
Figure 13:
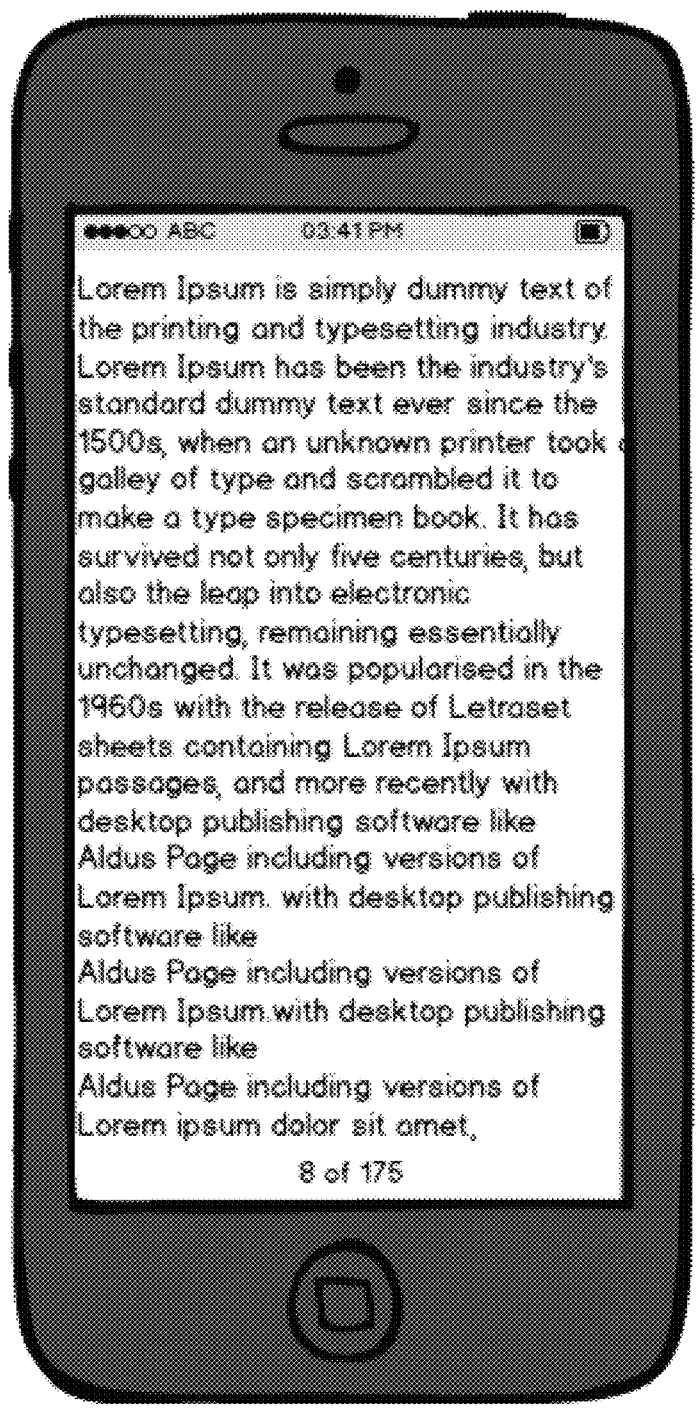
Figure 14:
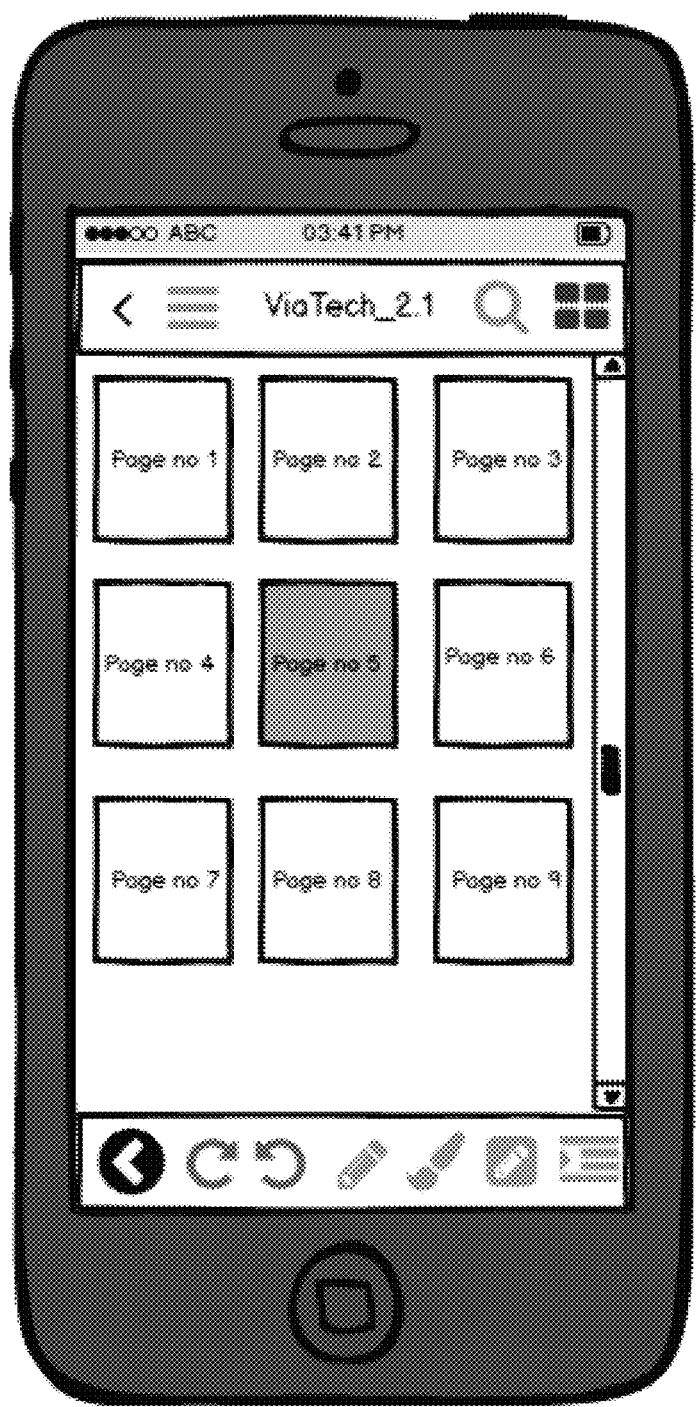

Additional tools are shown in the tool bar in FIG. 11. In FIG. 12, it can be seen that by selecting a certain portion of the document page, the text of the document can be zoomed in for greater clarity. In some embodiments, the image shown in the zoom window is merely a magnified version of the JPEG image. In other embodiments, text may be retrieved from the OCR database associated with that page and that zoom location and displayed in the zoom window. As can be seen in FIG. 13, the tool bar can be hidden so the displayed image of the document fills the entire user interface screen. As can be seen in FIG. 14, a user can navigate between pages of an e-document. In various embodiments, only a subset of the pages (i.e., images) of the e-document is downloaded from the virtual library. For example, when a user views a page of an e-document (e.g., page 5), that page (p. 5), the previous page (p. 4) and the next page (p. 6) may be downloaded. When the user advances to the next page (p. 6), the previous page (p. 4) may be deleted or returned to the virtual library and a subsequent page (p. 7) may be downloaded.

Figure 15:
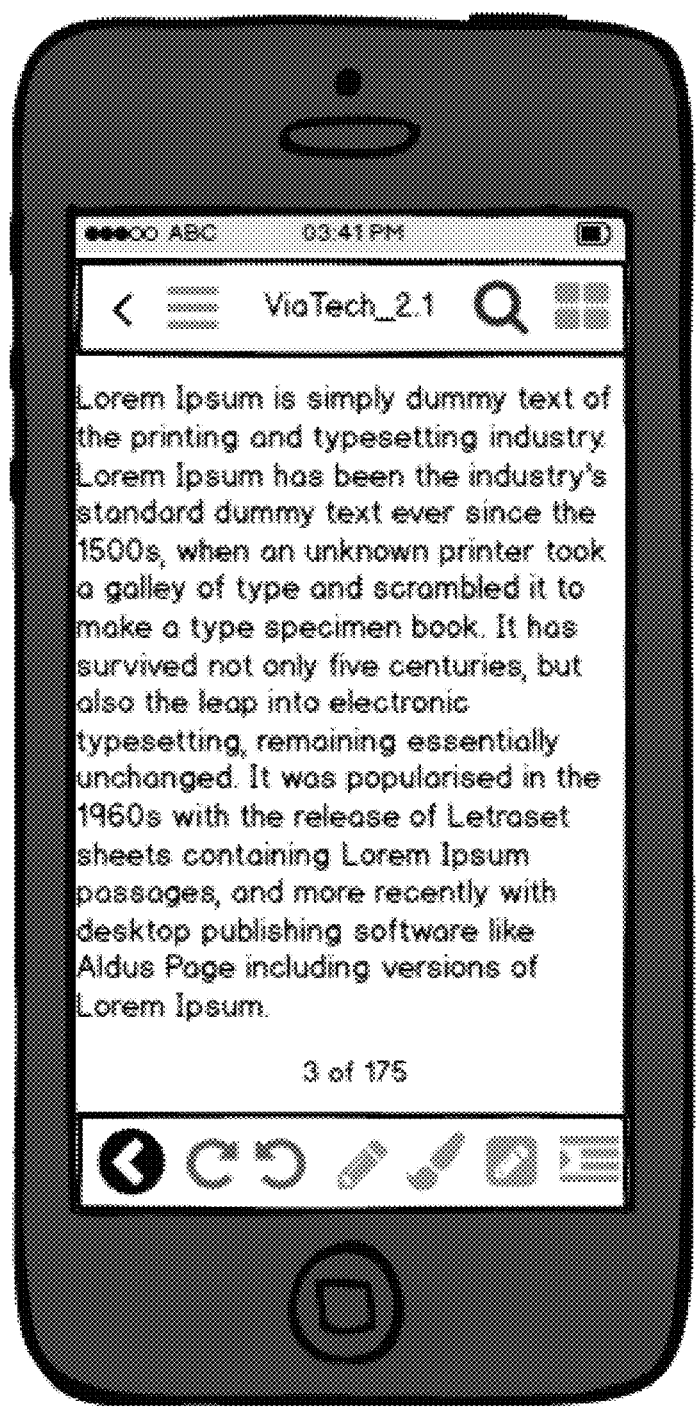
Figure 16:
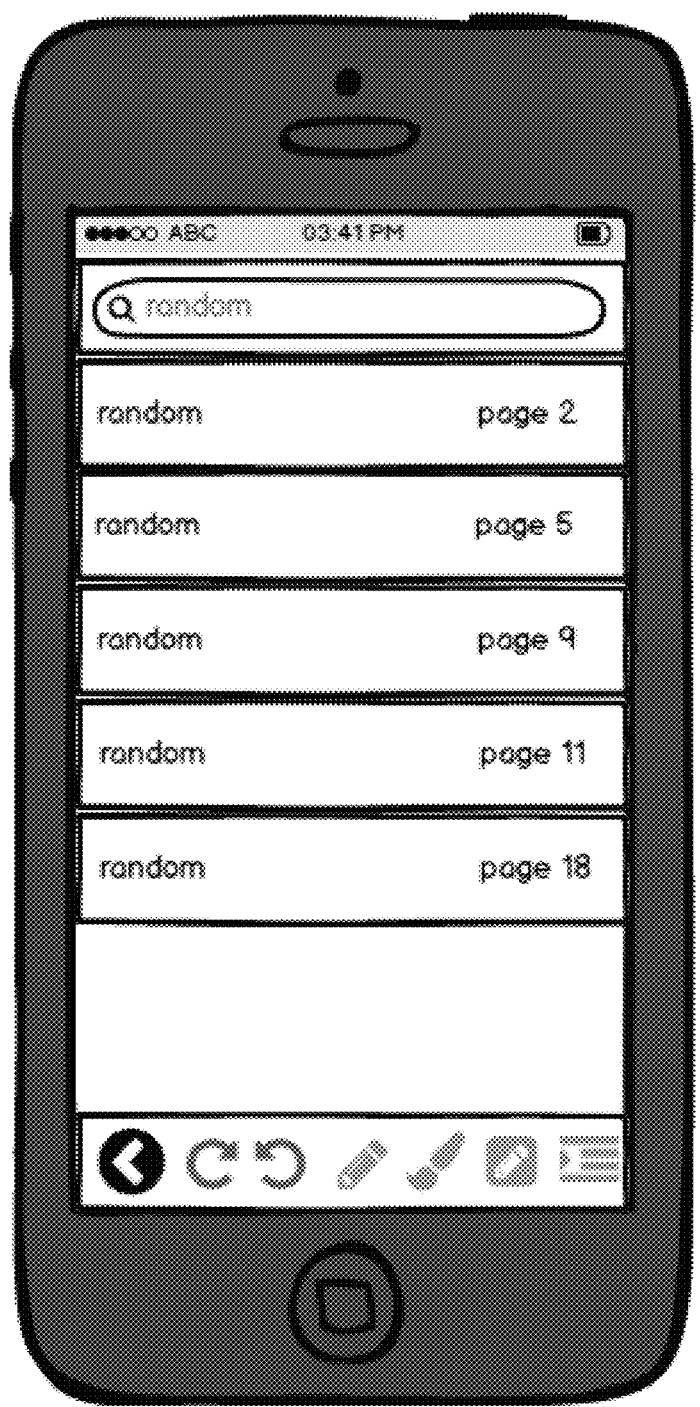

After selecting a particular page to view, the user interface on the computer screen displays the selected page. As can be seen in FIG. 15, in various embodiments, the user interface includes an annotation mode selection menu that permits a user to select from among a plurality of annotation modes for a displayed page of an e-document. According to one variation of the invention, these modes can include a pencil mode for making handwritten notes, a highlight mode for highlighting portions of the displayed image, a typing mode for typing in notes using a keyboard, and other functions. Additionally, undo and redo buttons may be provided for a user to undo an annotation or redo an annotation that has been undone. In various embodiments, the undo and redo functions may only be available for annotations made to a currently displayed image. In various embodiments, a new transparent JPEG or ink layer is created each time a user starts or stops a particular annotation activity. Each subsequent transparent ink layer is saved and time stamped. For example, after a user highlights a first sentence, a first ink layer having the first sentence highlighted is saved. Next, if a user subsequently highlights a second sentence on the same image page, a second ink layer having the first and second sentences highlighted is saved and time stamped. If the user selects the undo button, the second ink layer would be removed and replaced with the first ink layer. In various embodiments, once a user scrolls to a next page, the JPEG files corresponding to any ink layers other than the last ink layer may be deleted and, thus, the undo and redo buttons would be unavailable. In other embodiments, all JPEG files may be saved until a user specified time. In various embodiments, an activity tracker may store a log of user annotation activities, including text entered by the user, such that the step of highlighting the first ink layer may be recorded even though the first ink layer is no longer saved. In other embodiments, a predetermined number of annotations may be undone or redone, regardless of the page currently being viewed. As can be seen in FIG. 16, a user can do a text based search of the document and the results include an indication of which pages of the e-document contain the searched text. In various embodiments, the full text of the e-document may be encrypted and stored within the active reader application and inaccessible outside of the application, for example, inaccessible using the searching function located on a smartphone. In various embodiments, the text-based search may include searching all e-documents located on the user's mobile device, may include all of the e-documents in the virtual library, and/or may include a search of publicly available documents.

Figure 17:
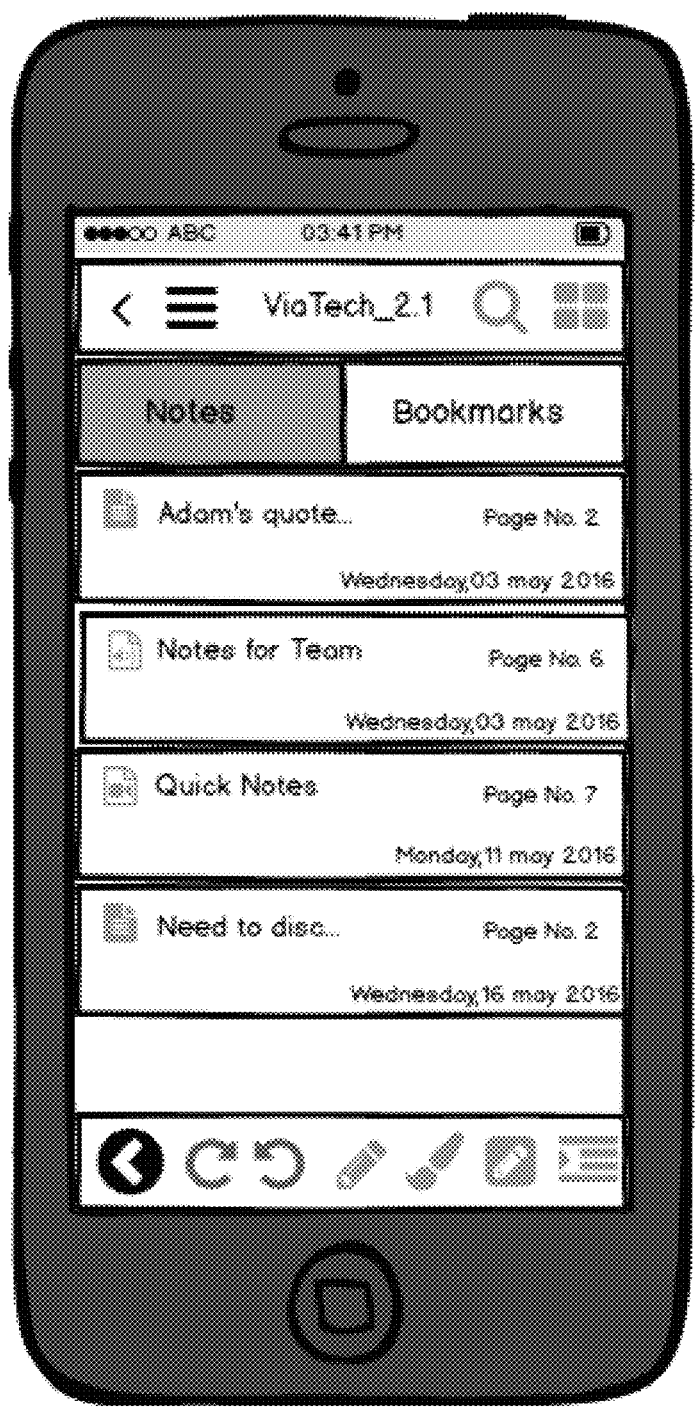
Figure 18:
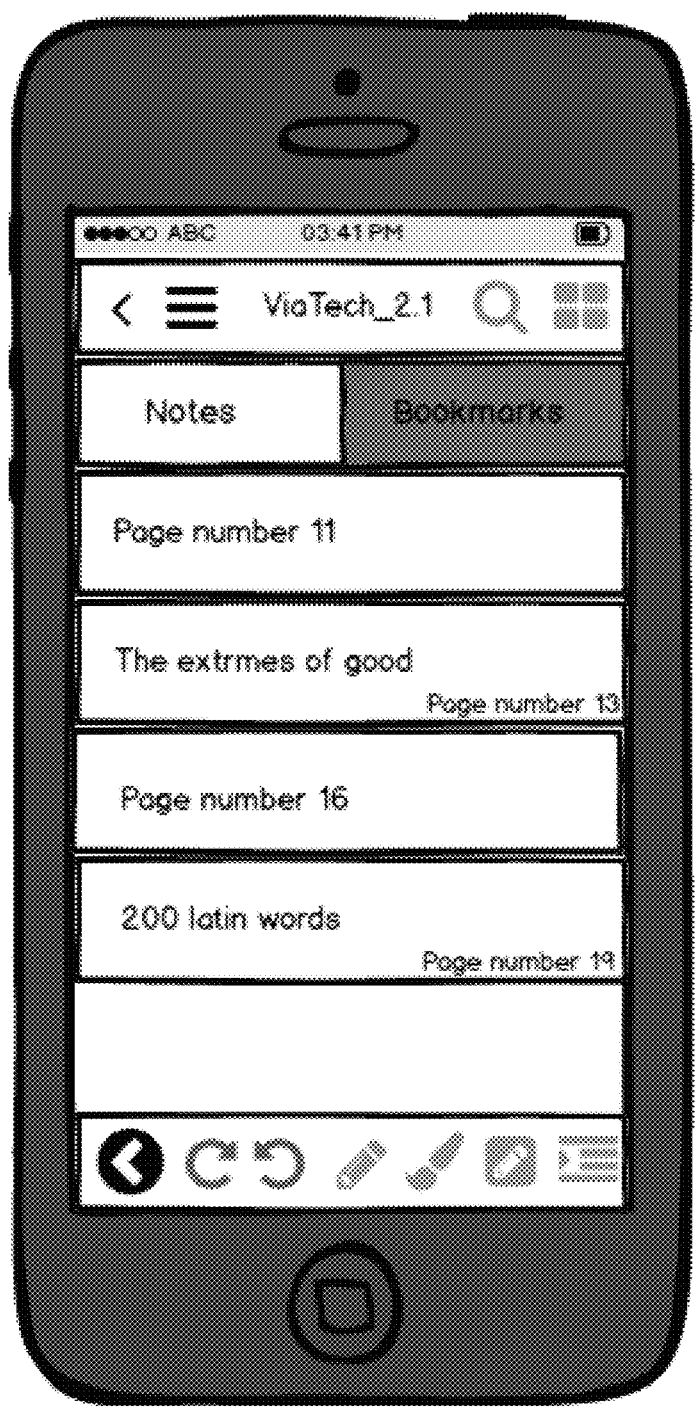
Figure 19:
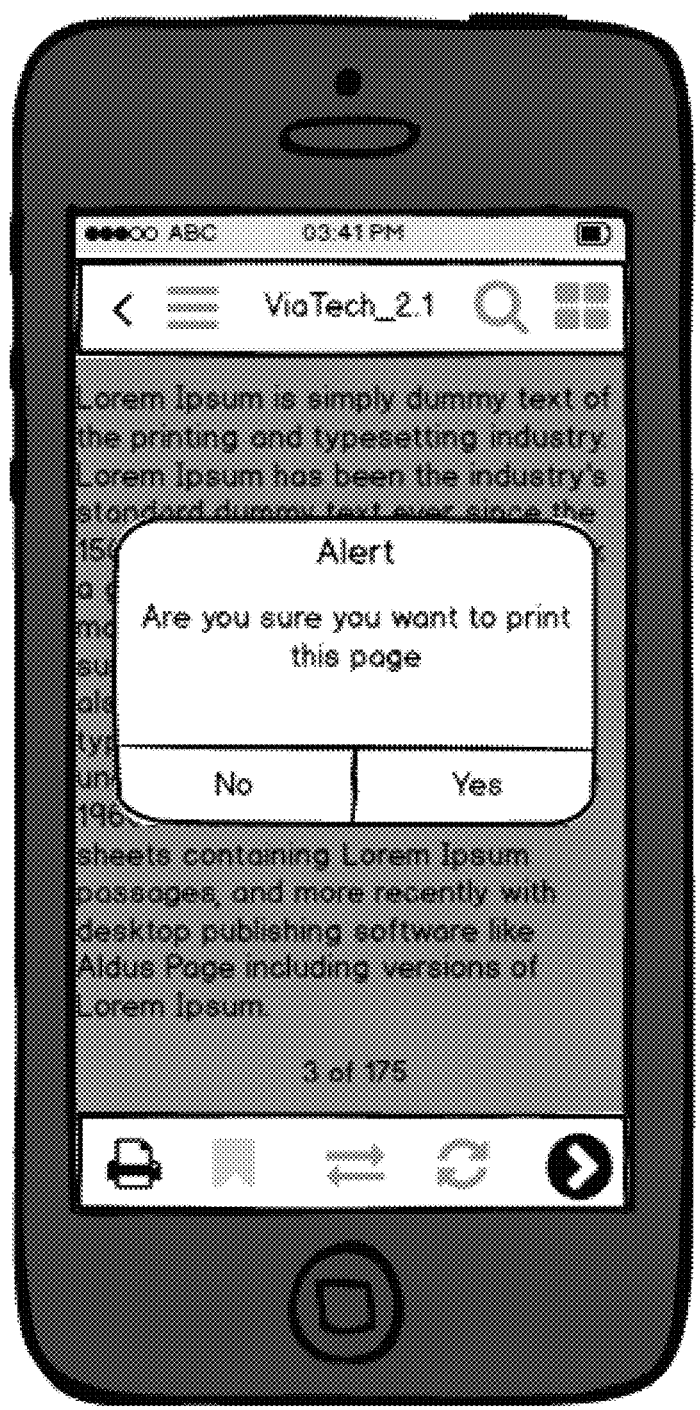
Figure 20:
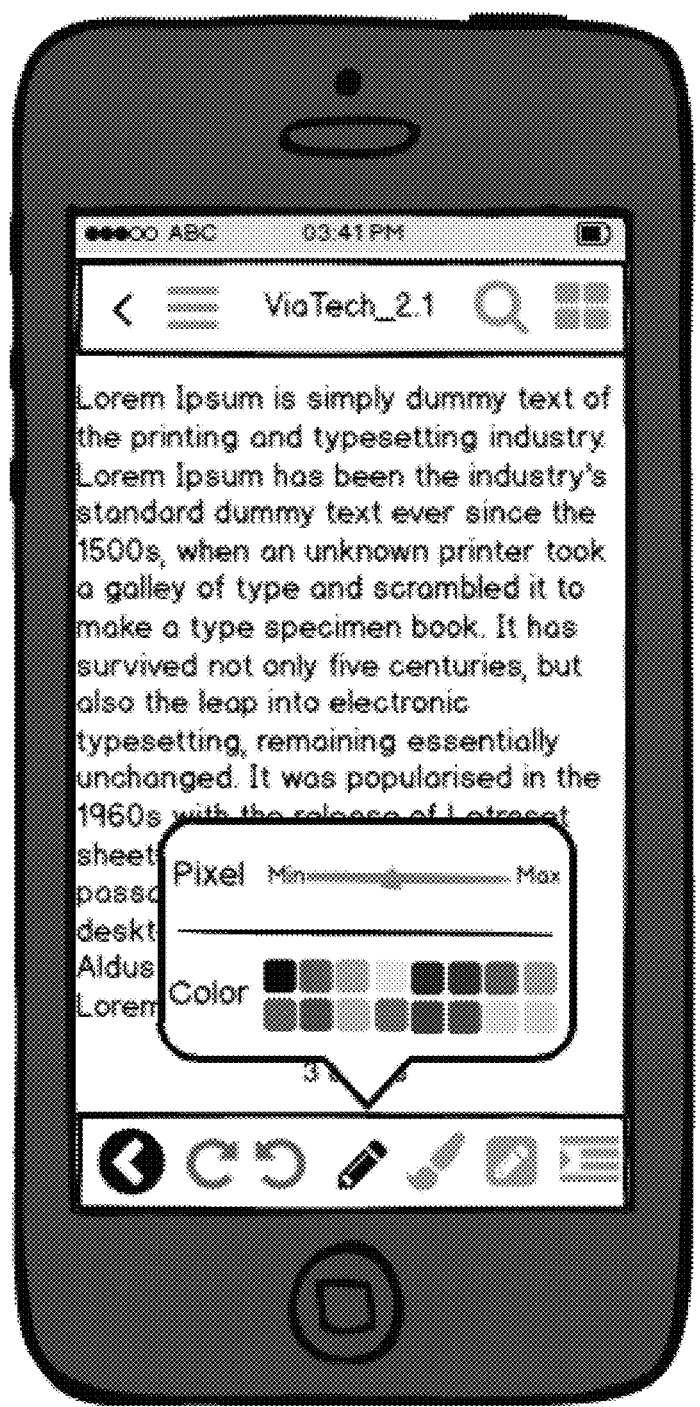
Figure 21:
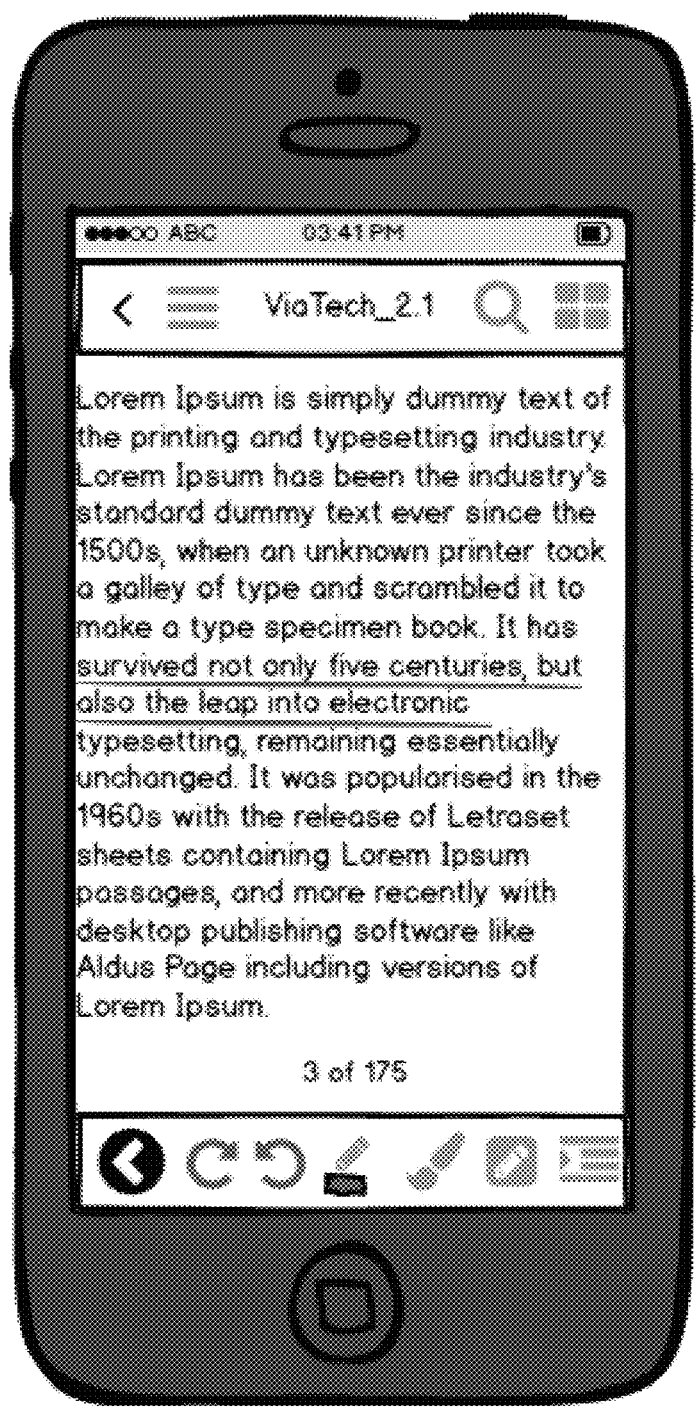
Figure 22:
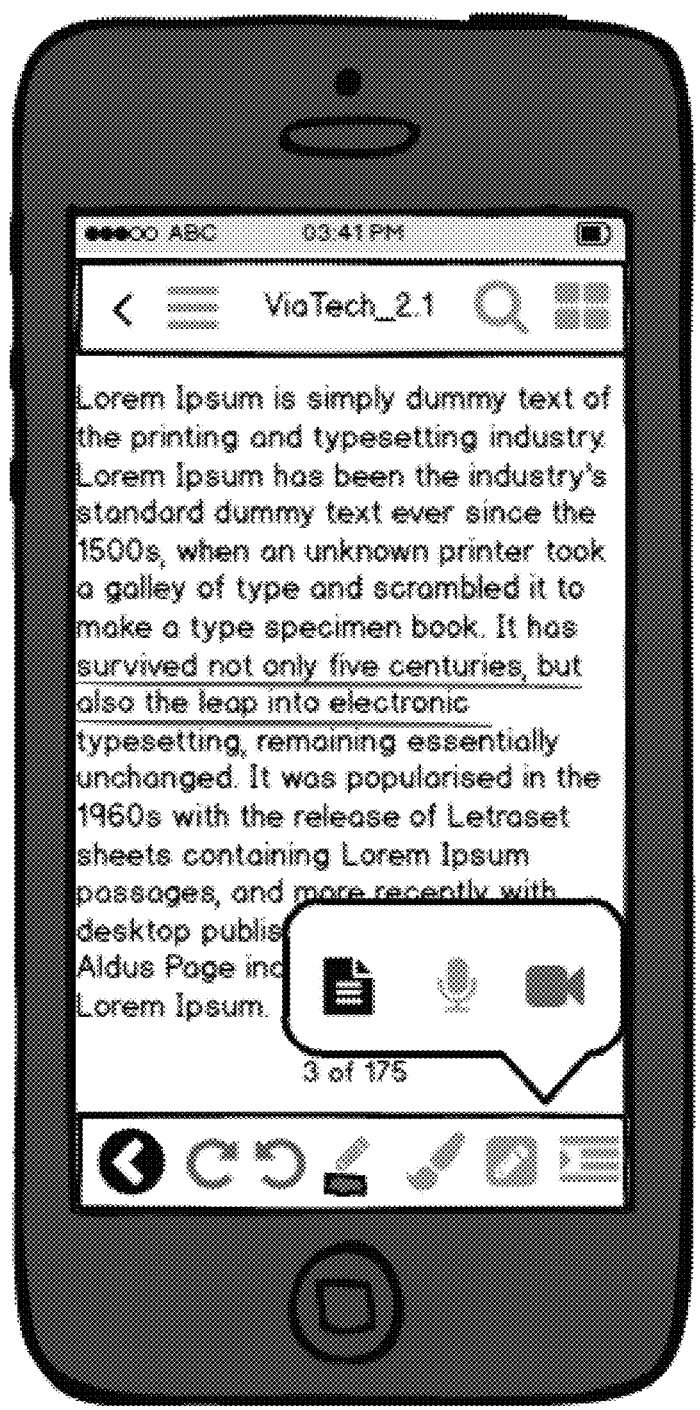
Figure 23:
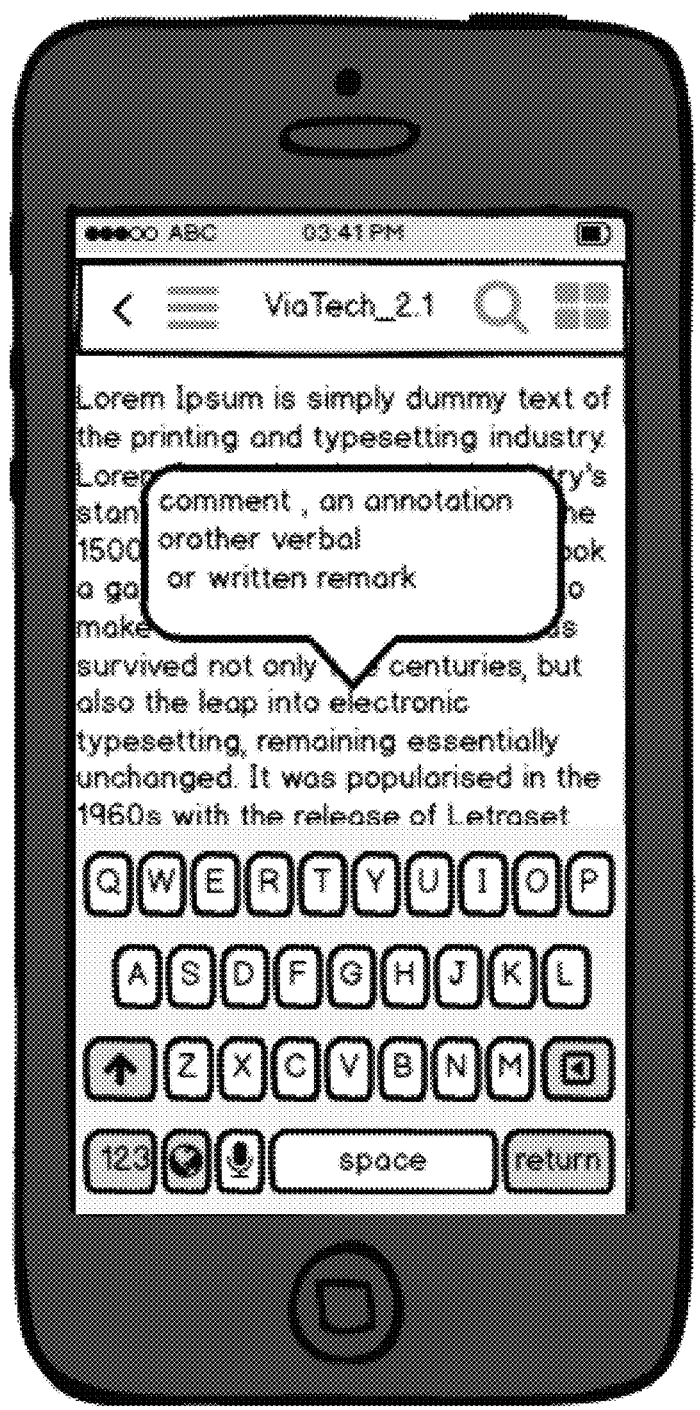
Figure 24:
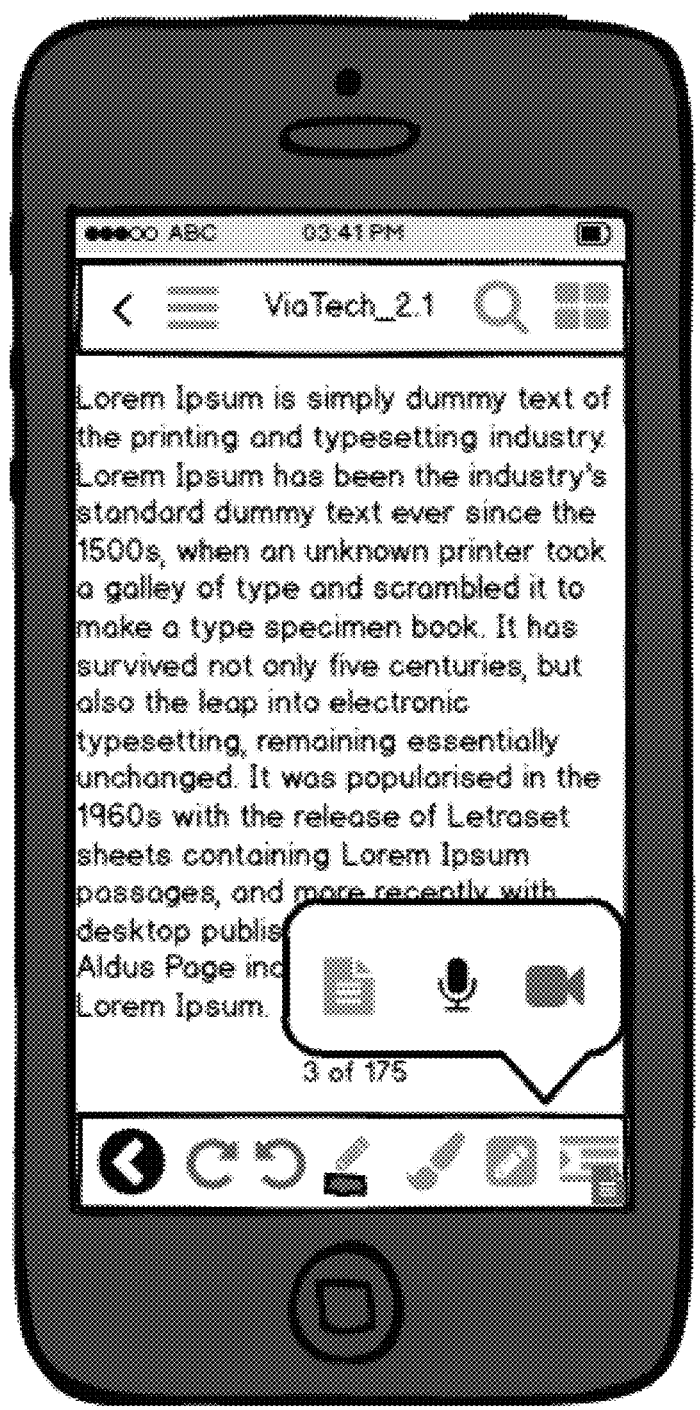
Figure 25:
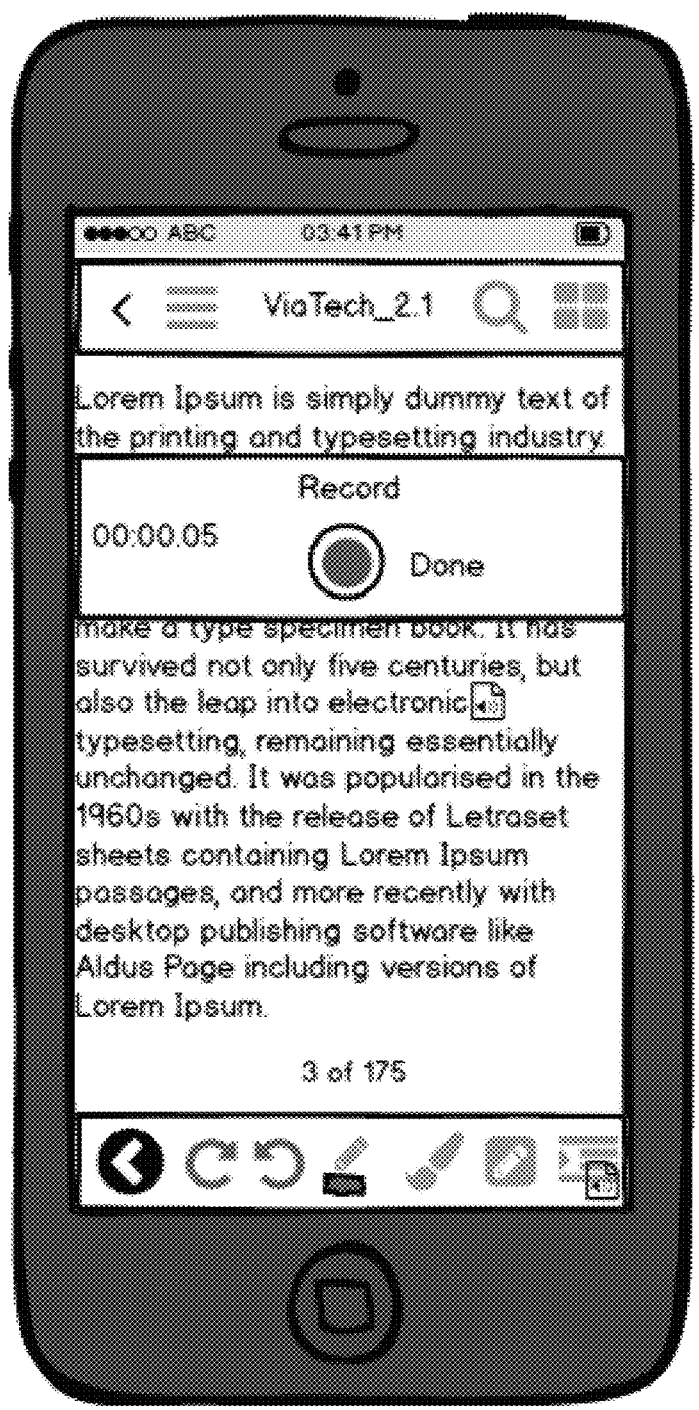
Figure 26:
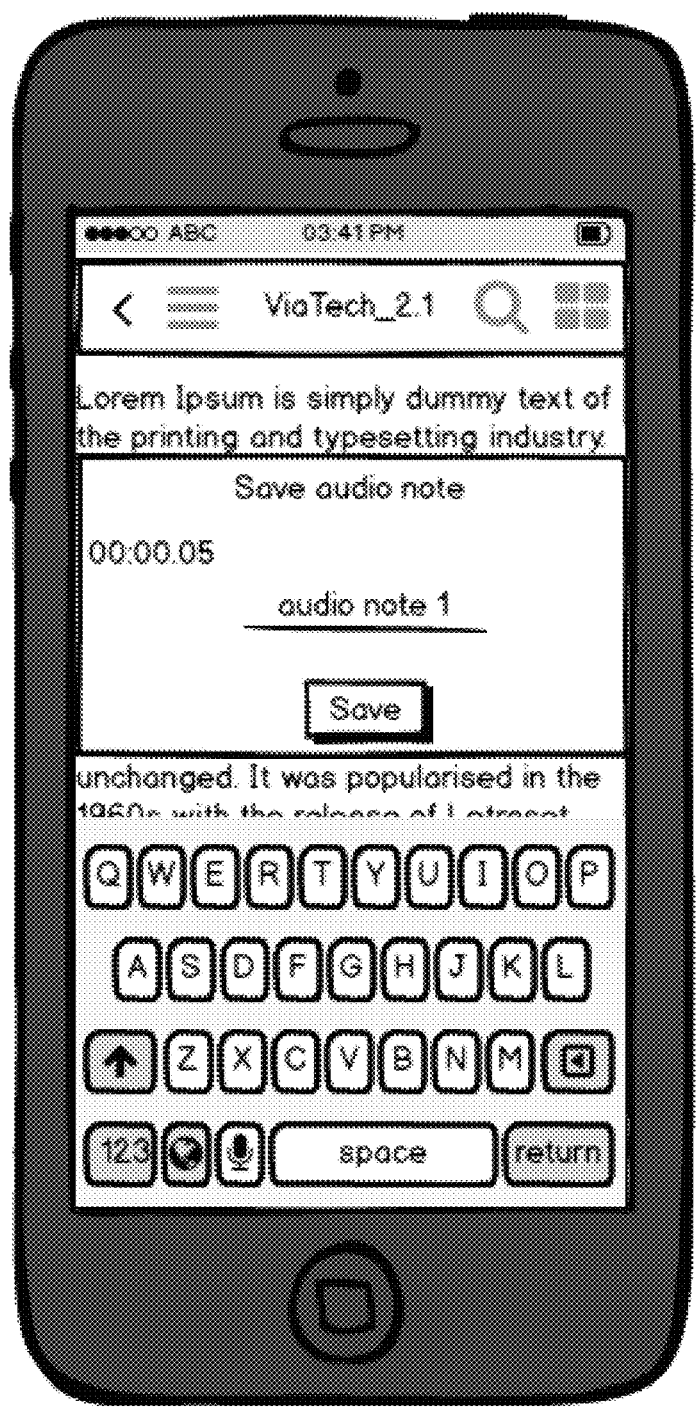
Figure 30:
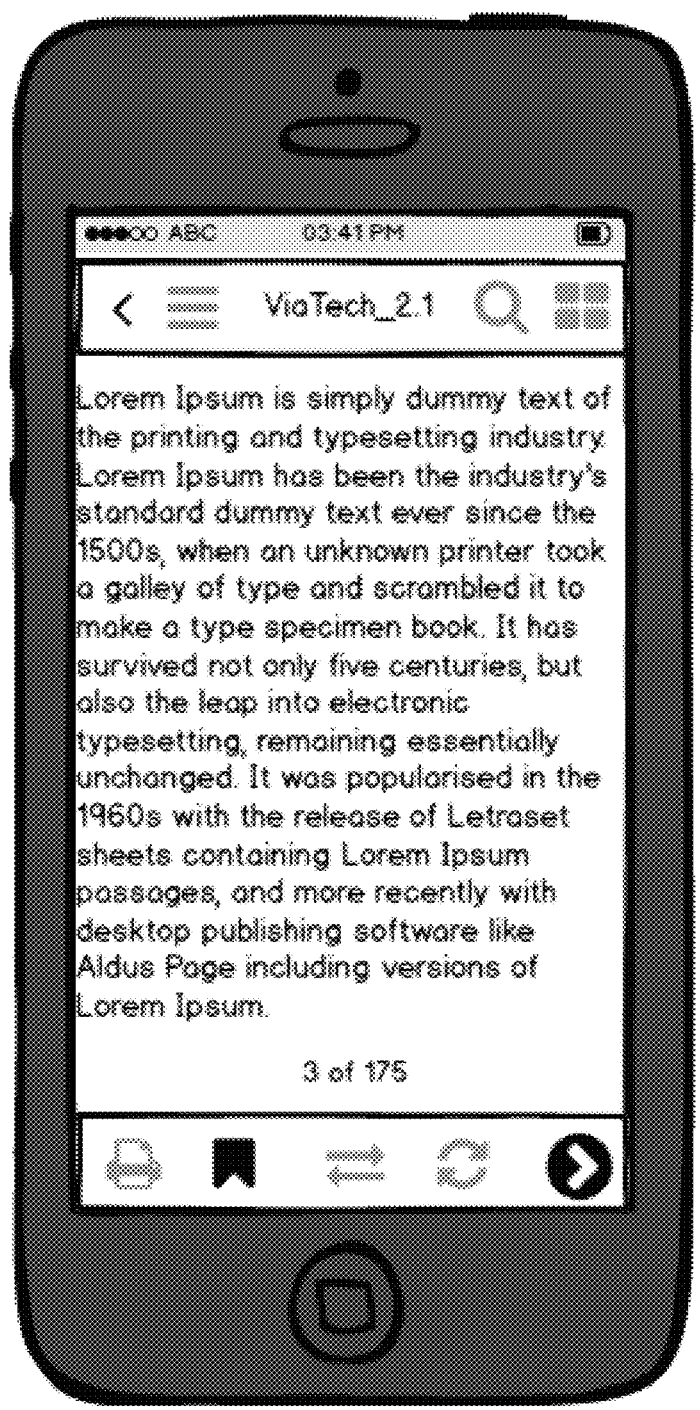
Figure 31:
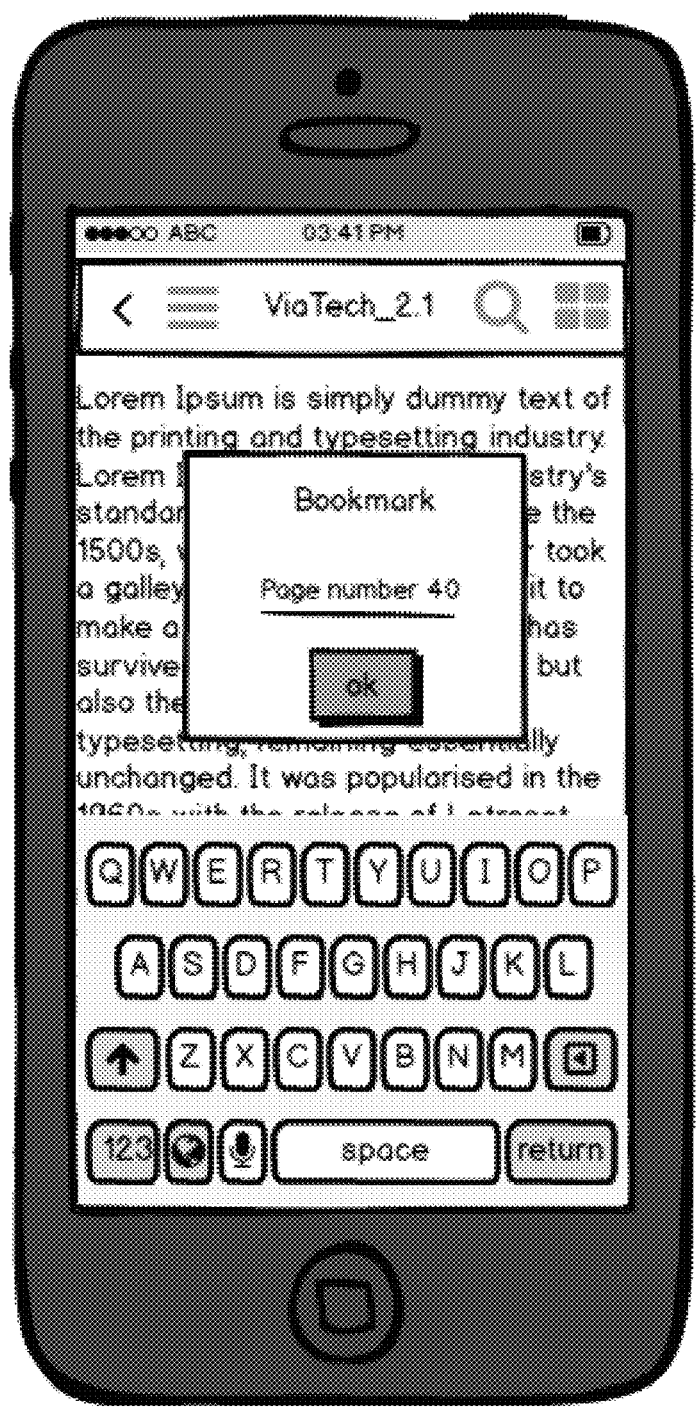
Figure 32:
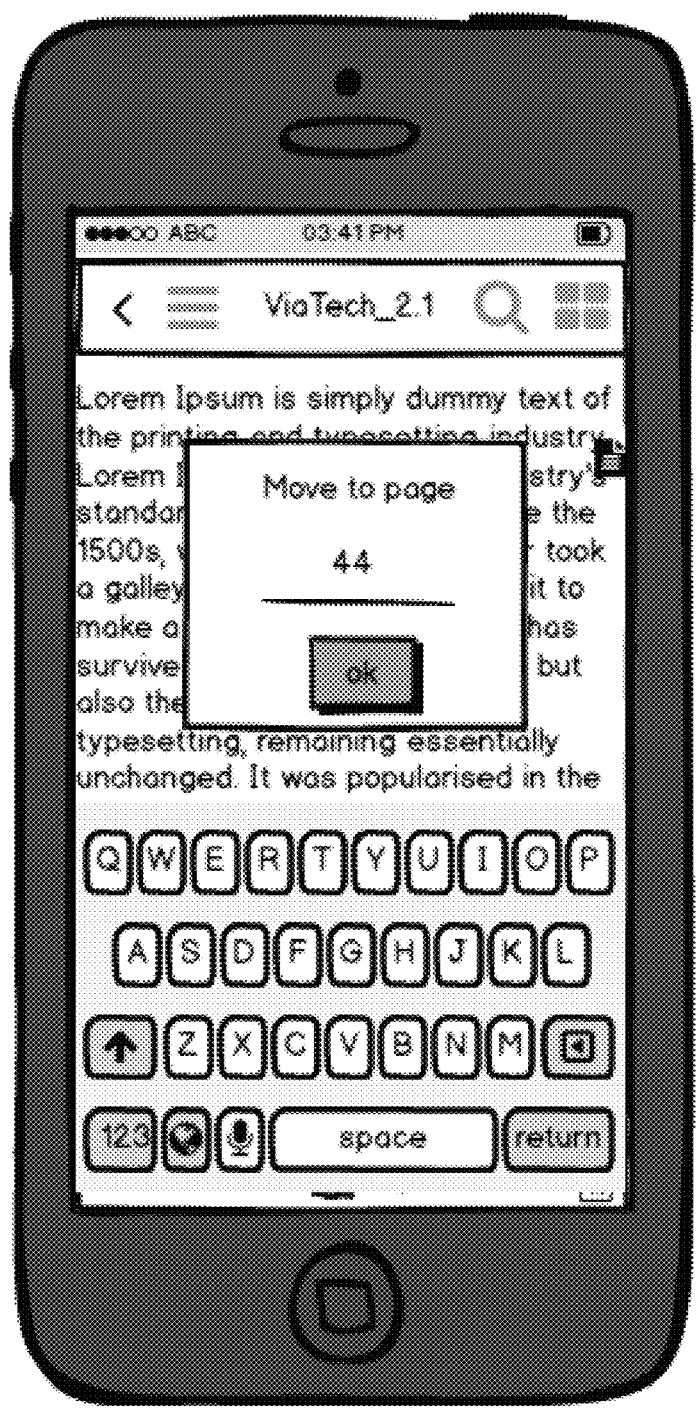
Figure 33:
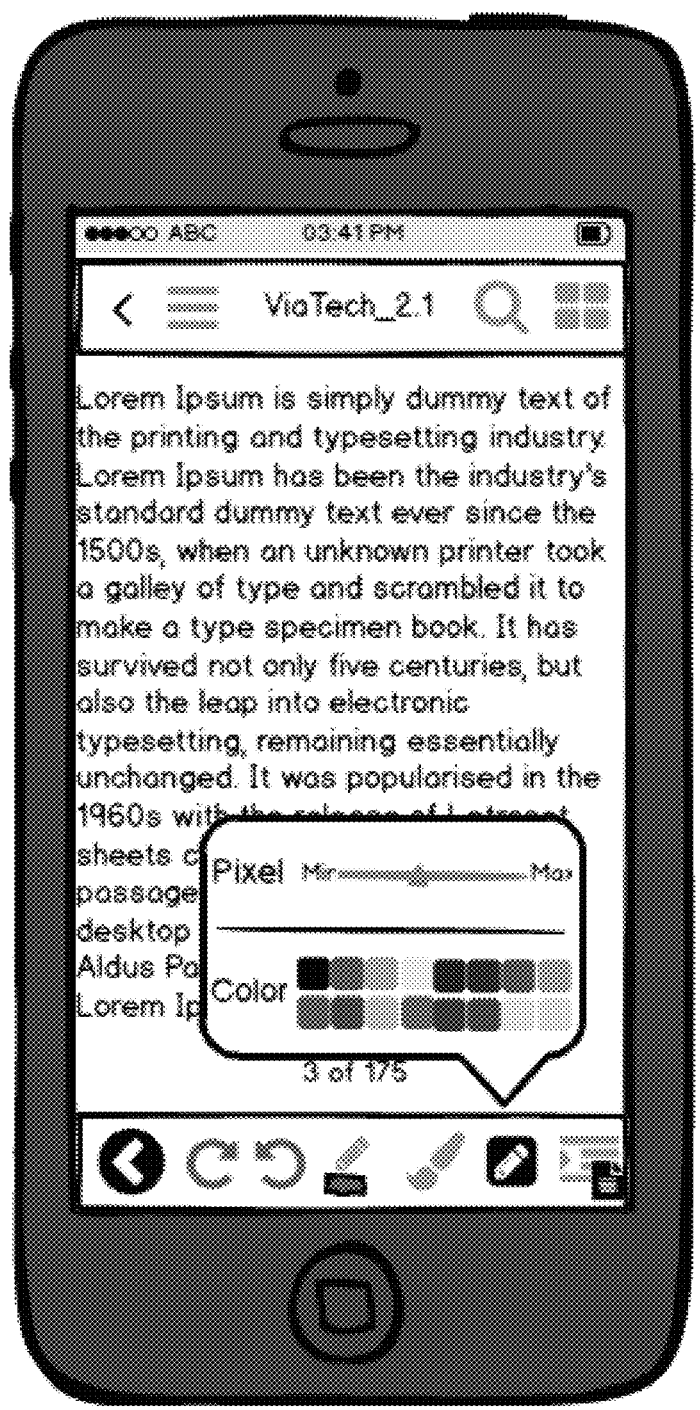
Figure 34:
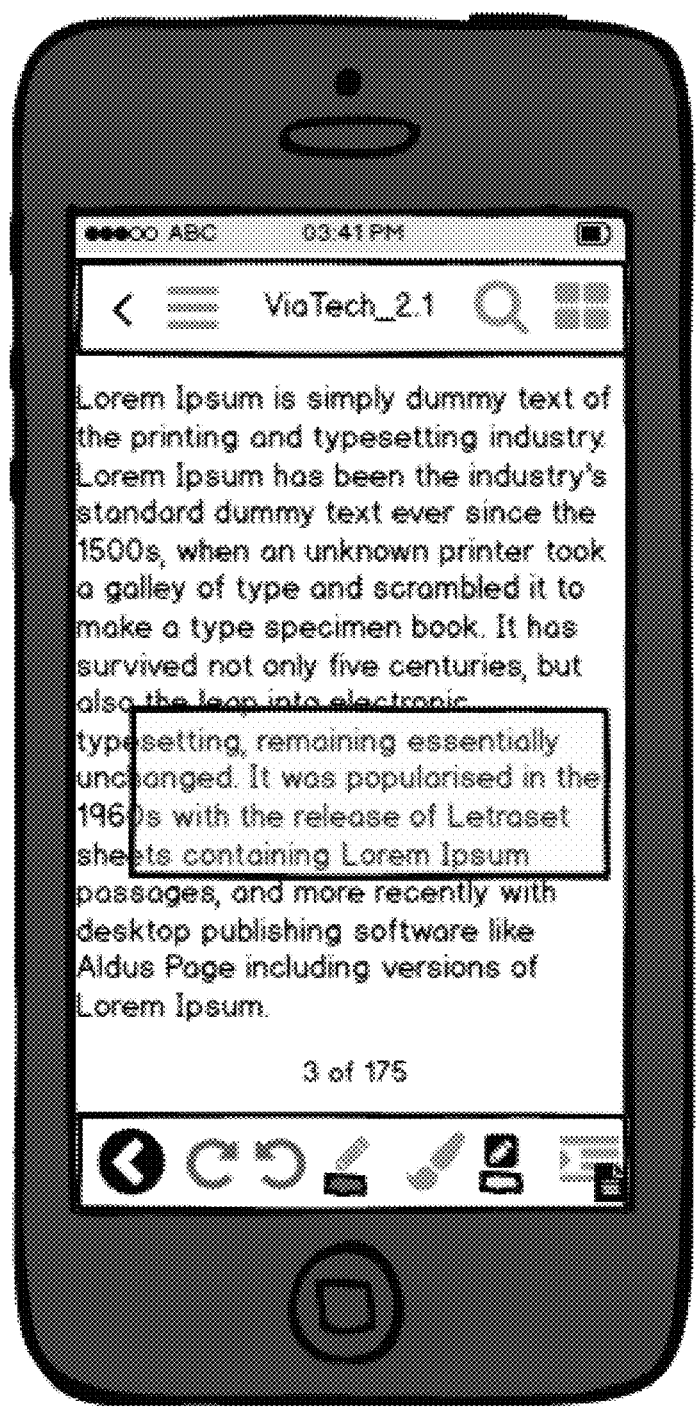
Figure 35:
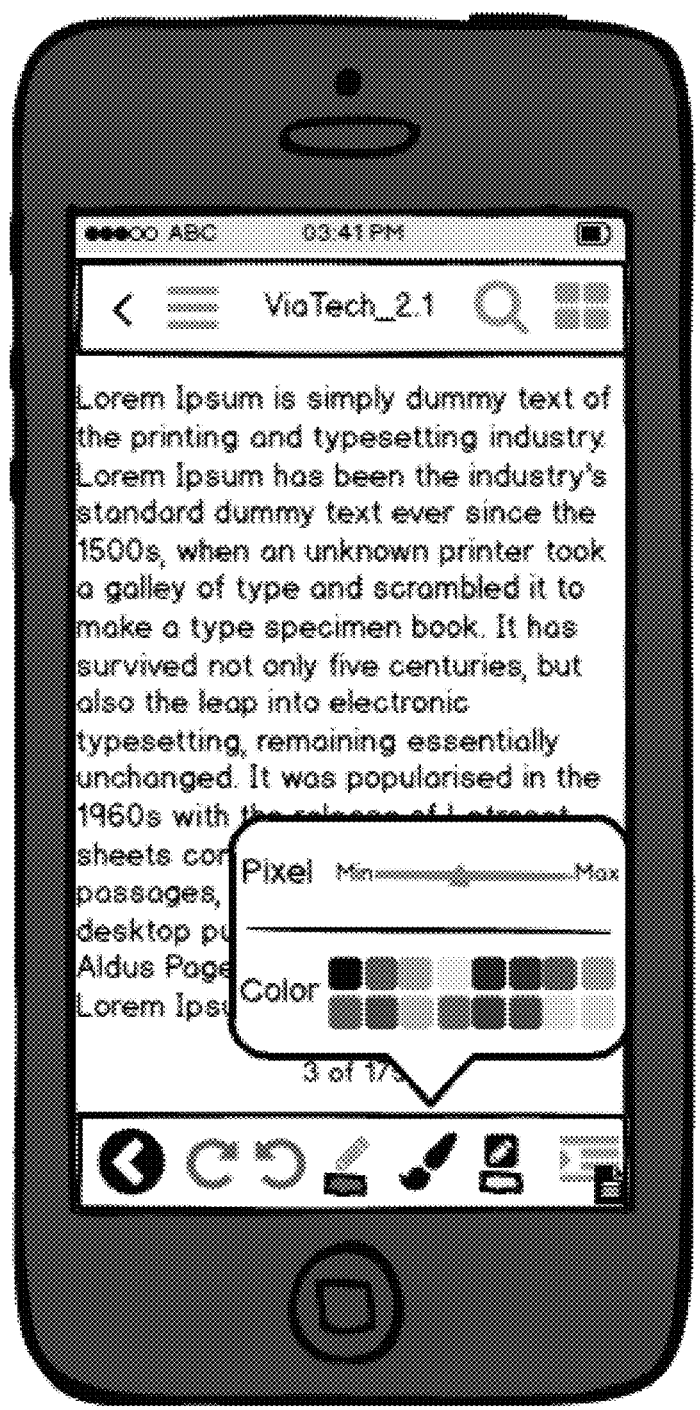
Figure 36:
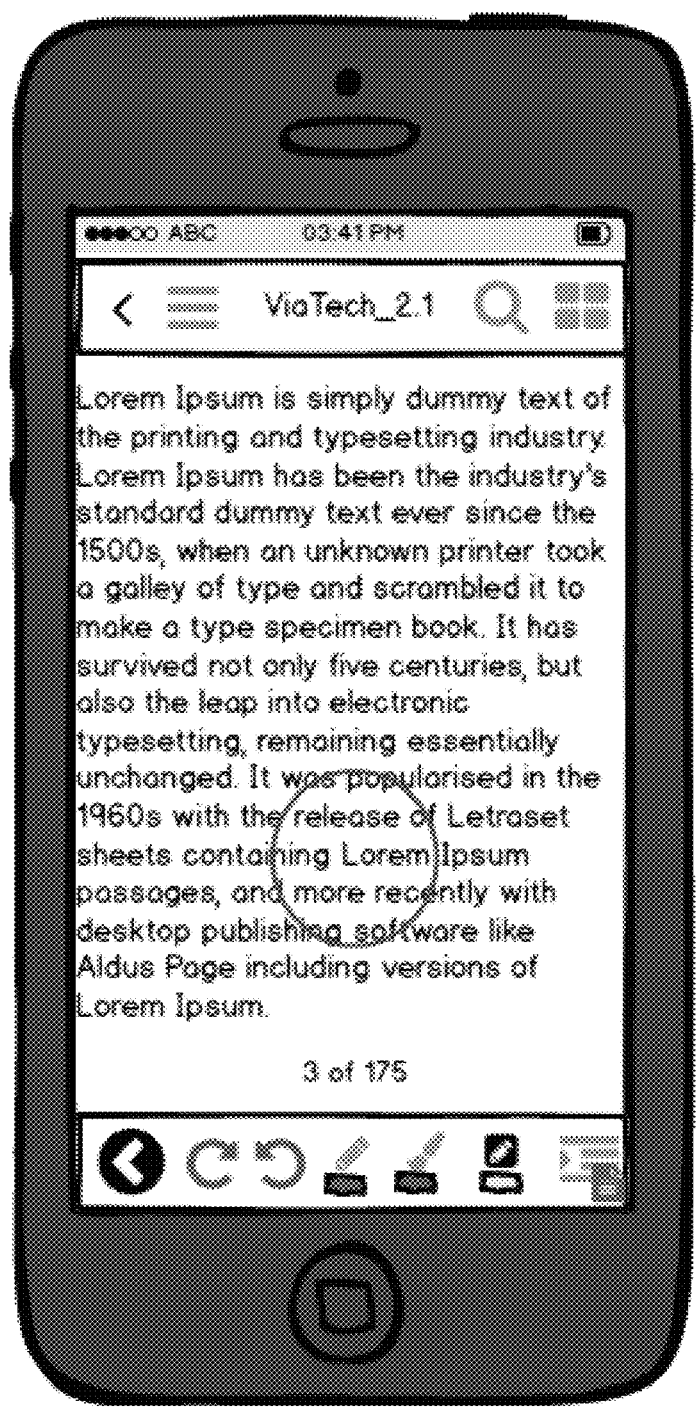
Figure 37:
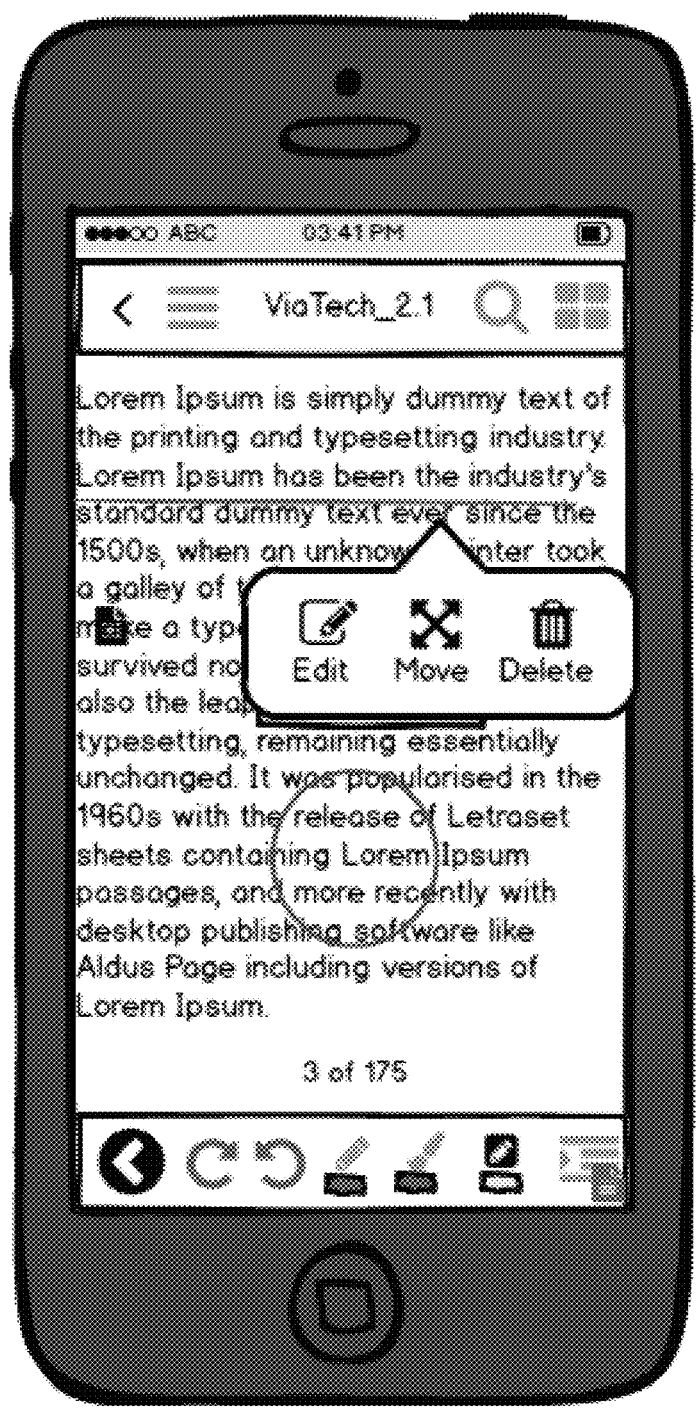
Figure 38:
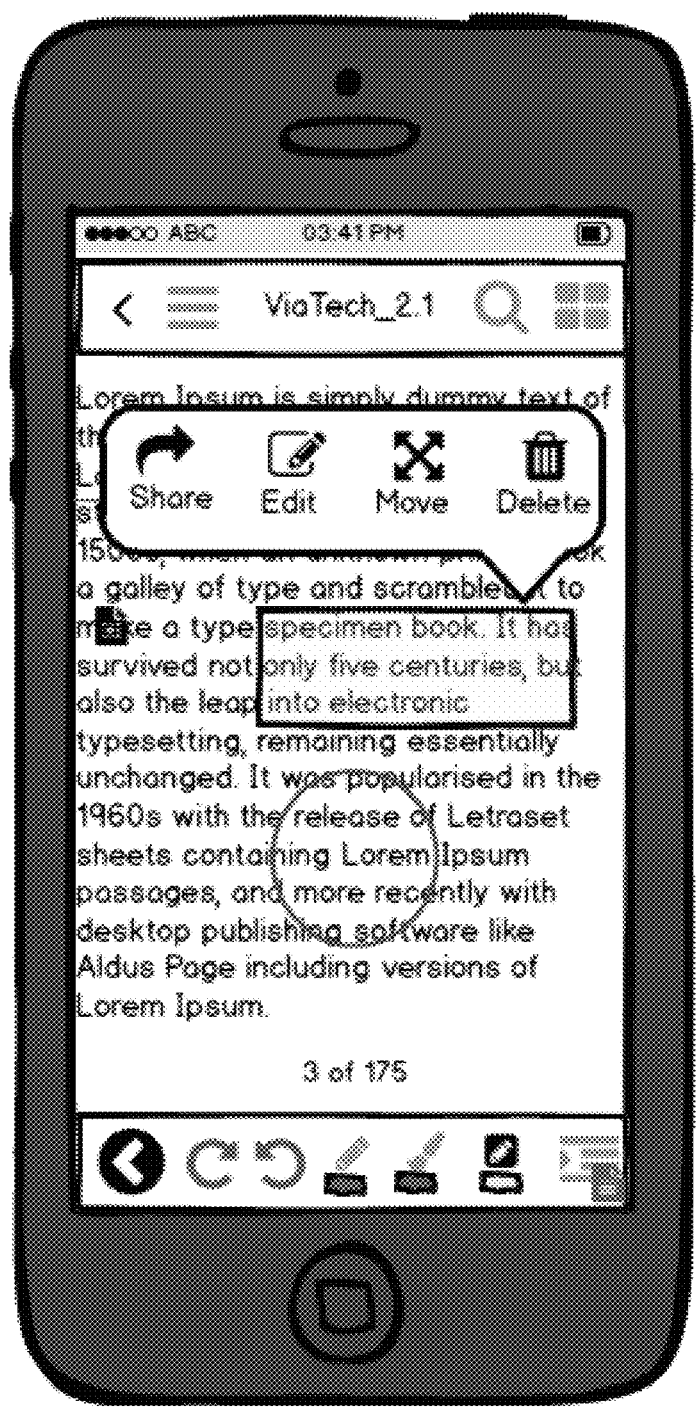
Figure 39:
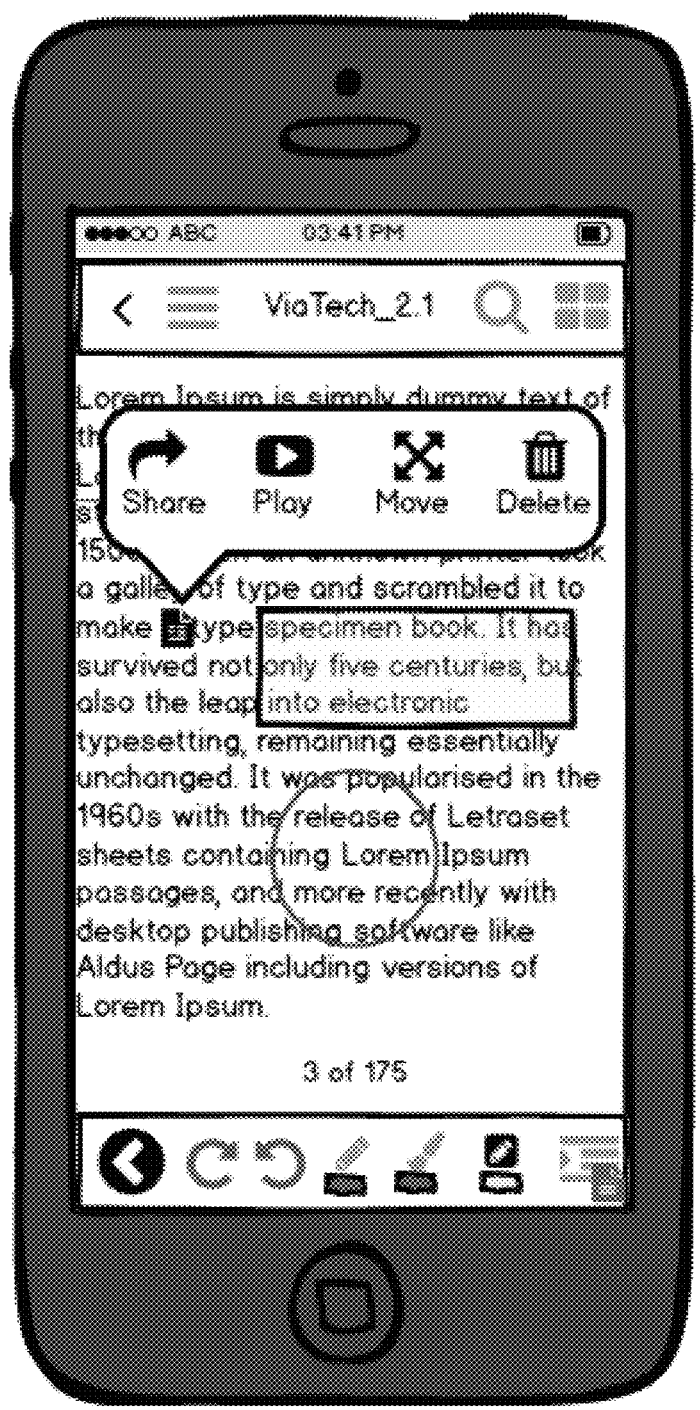
Figure 40:
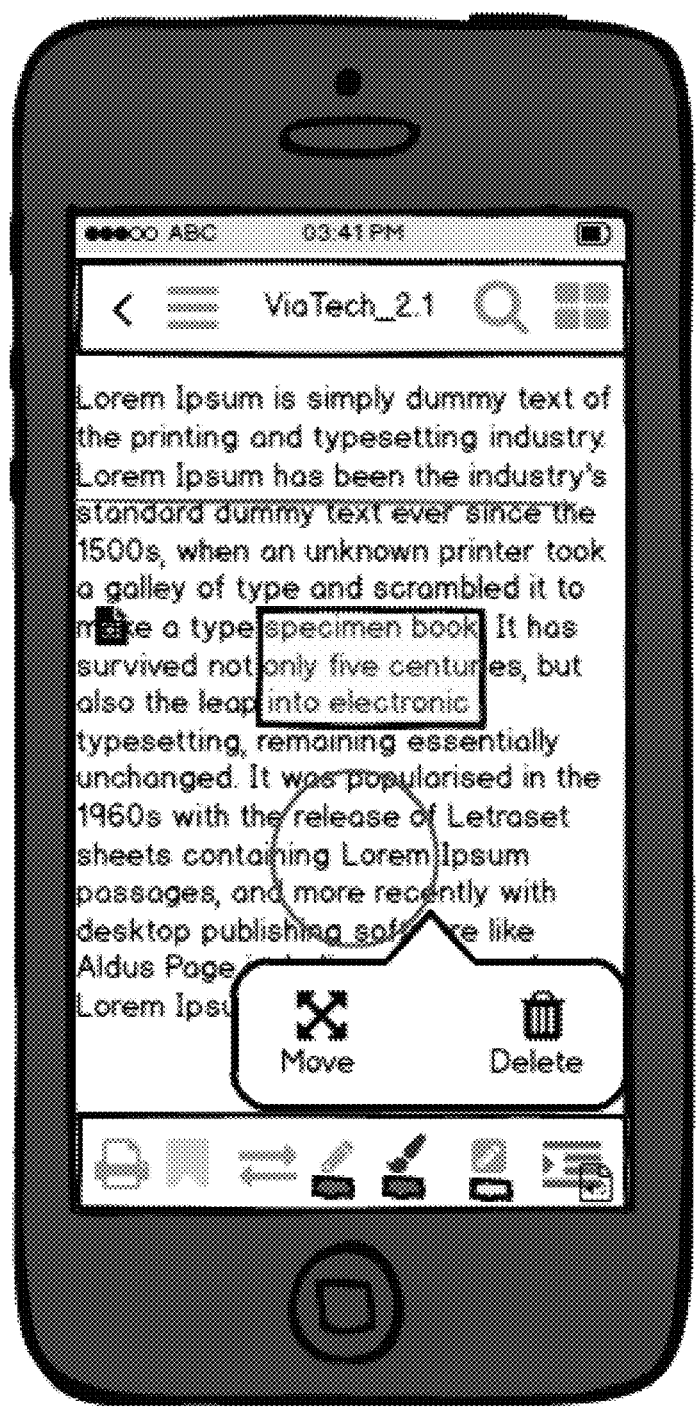

As can be seen in FIG. 17, annotations may be shared among various users. In one embodiment, annotations are specific to each user, such that other users who view the same document will not see other users' annotations. This feature can be implemented using log-ins or other user identifiers. For an identical e-document retrieved at two different remote computers, annotations made on one remote computer would not show up on the other remote computer, since the annotations are made independently of the e-document content. For example, if a e-workbook is downloaded by a plurality of users, such as students in a class, annotations made by one user, such as answers to questions contained in the e-workbook, would not be viewable by any other user, but may be viewable by an admin user, such as a teacher. It is, however, within the scope of the invention to permit sharing of annotations if desired. In some embodiments, the annotations may be emailed to other users and/or may be uploaded to the virtual library for sharing. As can be seen in FIG. 18, a user may bookmark certain pages and/or certain portions of those pages. Depending on user permission settings, a user may print a page or range of pages of an e-document as indicated by FIG. 19. As shown in FIGS. 20 and 21, a user may select various colors for annotations and may also vary the thickness of annotation lines. As can be seen in FIGS. 22-29, annotations may include audio notes and/or video notes. In some embodiments, an audio note may be associated with a particular portion of a page of a document. For example, a student viewing an electronic text book using the active reader application during class could record what a teacher says about a particular passage and have it saved as part of the e-book. As another example, two members of a project team located remotely from each other could send video messages back and forth to each other and have those messages be tied to specific portions of a document and viewable while reading the document. As explained in more detail below, the video messages may be transferable among various versions of the document even if the content of the documents has been changed. As can be seen in FIGS. 30 and 31, the active reader application allows a user to bookmark places in the e-document. As can be seen in FIG. 32, a bookmark can be moved from one location to another. As can be seen in FIGS. 33 and 34, sections of text may be highlighted. As shown in FIGS. 35 and 36, designs may be drawn onto the screen and, once drawn, the design may be moved around. As can be seen in FIG. 37-40, annotations may be replayed, shared, edited, moved, or deleted.

Figure 41:
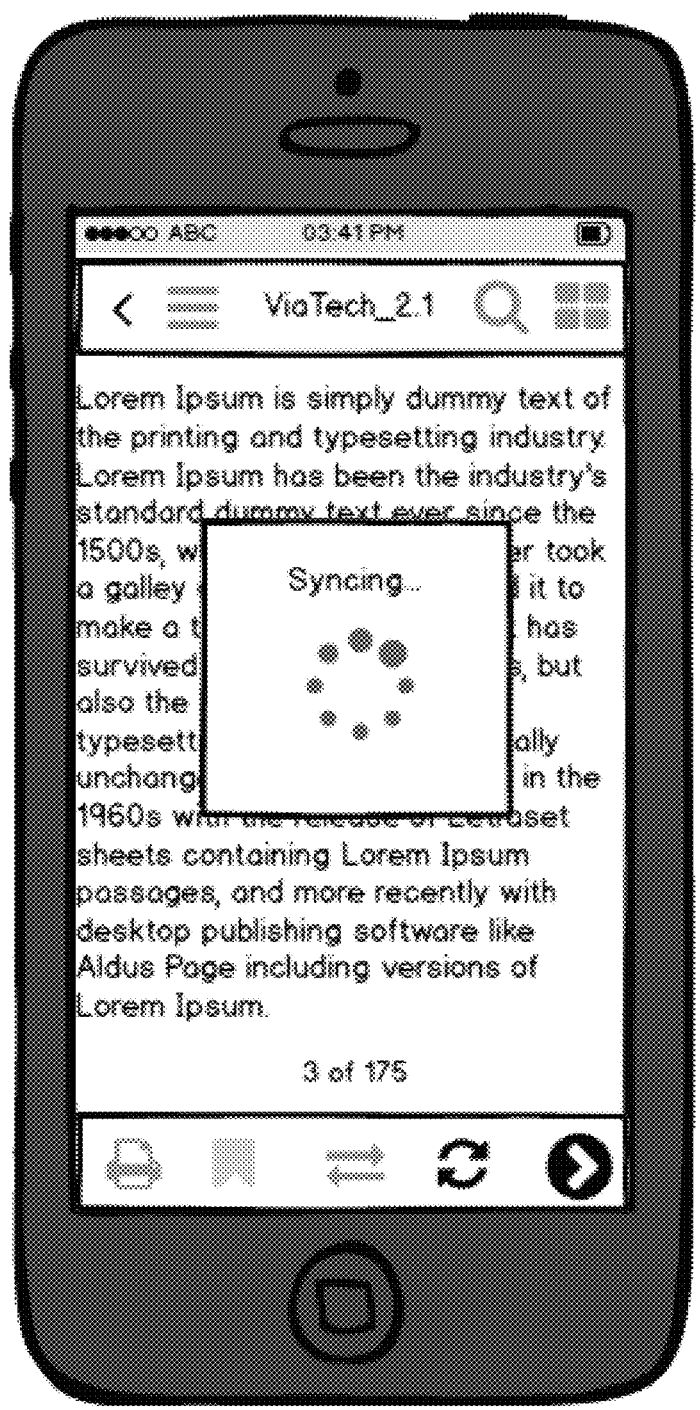

As can be seen in FIG. 41, the annotations may be synched. In some embodiments, the annotations are automatically synched with files stored in a virtual library. In some embodiments, the annotations may be collected and sent to other users, such as an admin user. For example, an e-document may be an e-workbook or test downloaded by a plurality of users, such as students in a class. The users may make annotations within the e-workbook or test, such as filling in a blank, typing text within a designated location, and/or selecting an item from a list, and those annotations may be collected and sent to an admin user, such as a teacher, either in real time or at the end of a predetermined time. The admin user may then review the annotations, which would each be associated with a particular user, for example, in order to grade the assignment or test. In some embodiments, certain metadata may be sent to the admin user, such as the number of pages of a book a user has read, the time a user has spent reading, certain date and/or time information, such as whether and/or when a user made annotations. In some embodiments, the files stored on the user device and/or files stored in the virtual library may be updated with annotations to a page of a document when the user moves to the next page of the document. In some embodiments, the user may manually save and synch annotations. In some embodiments, an admin user may send a user annotations to a document, for example an instructor's notes. In various embodiments, a user may view/review those notes either alone or in combination with the user's own annotations.

Figure 27:
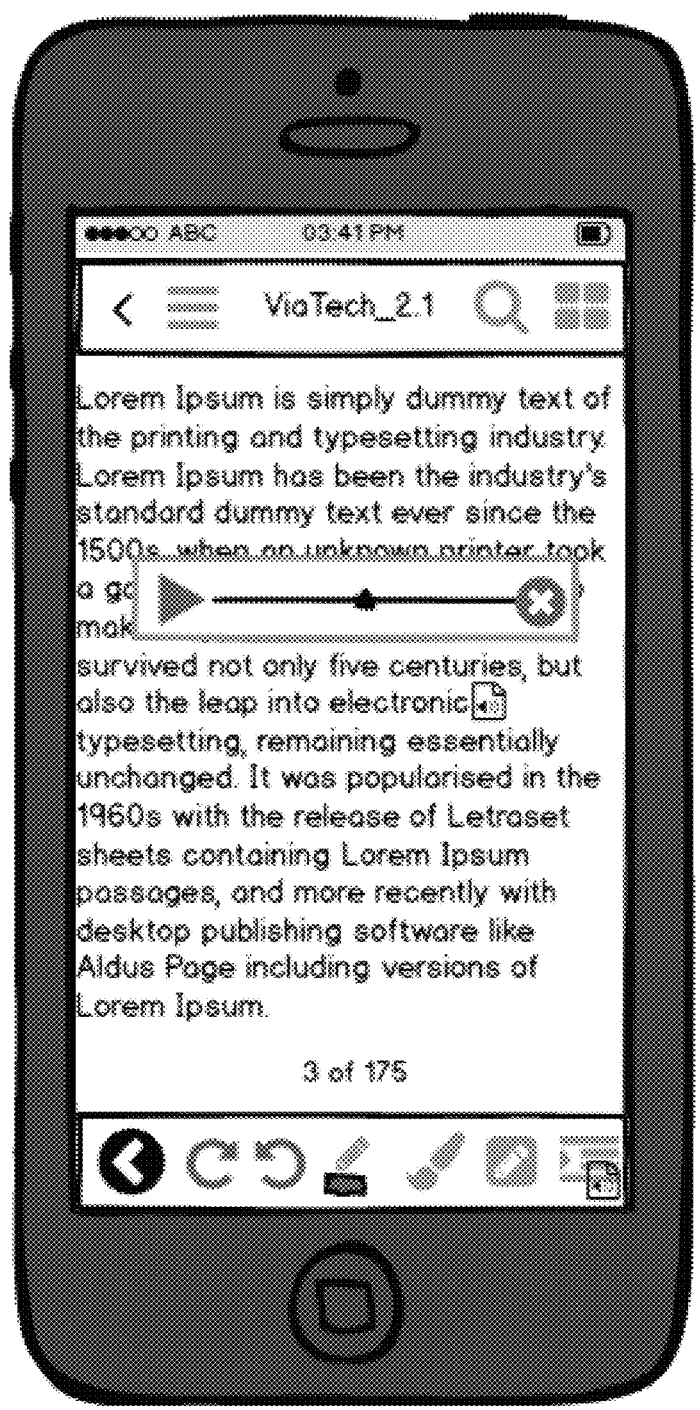
Figure 28:
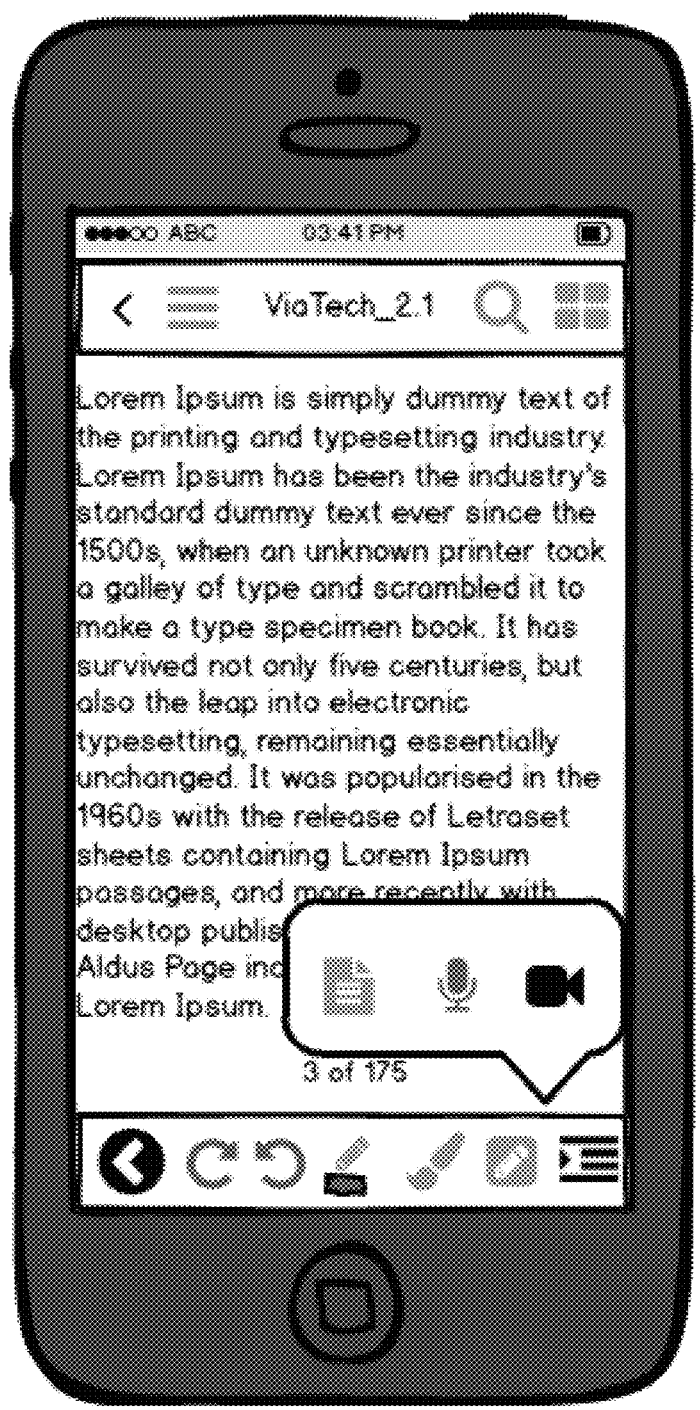
Figure 29:
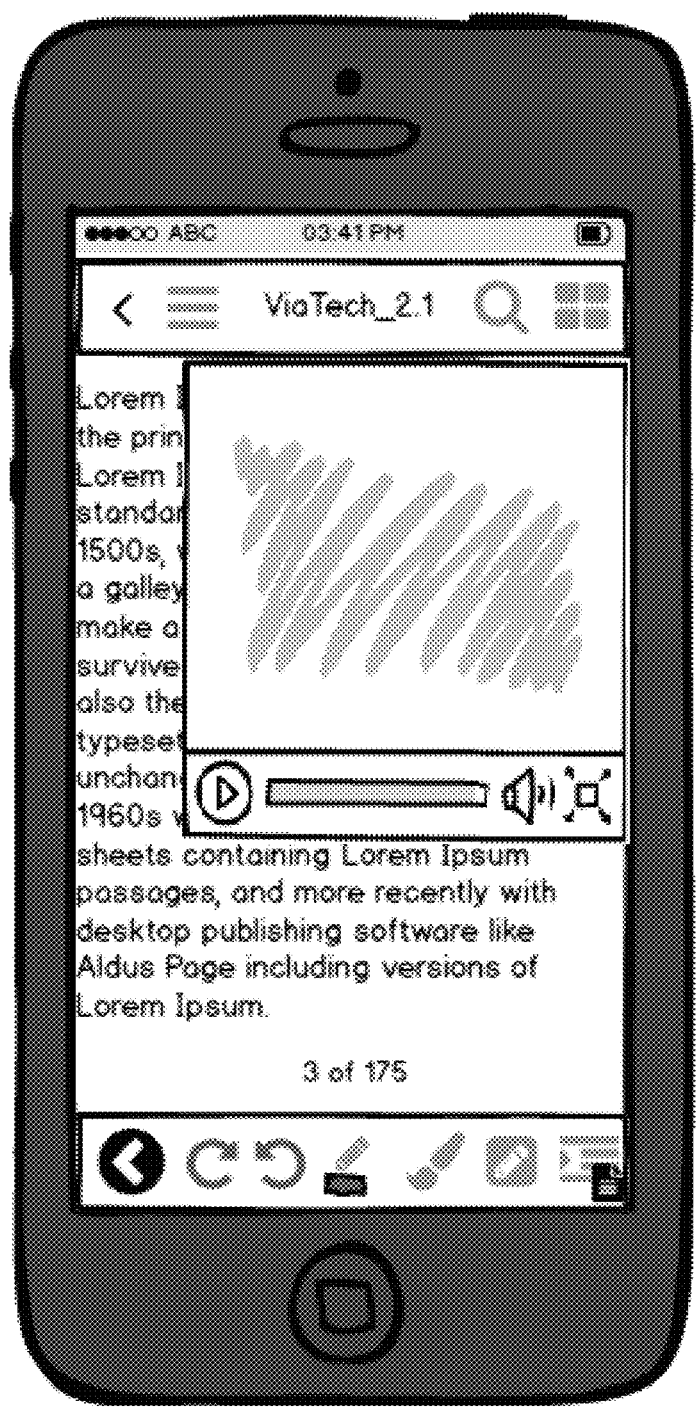

In some embodiments, the annotations may be transferred from a first version of the document to a second version of the document. For example, a user may make annotations to a page of a document, the user may then receive a revised version of that document, either automatically from the virtual library as part of the synching or by manually downloading the updated document, and the active reader may then transfer the annotations to the corresponding page of the revised version of the document. In some embodiments, the annotations may be automatically transferred with no user input, the user may be prompted to select which annotations to transfer to the new version of the document, and/or a combination of the foregoing with some annotations being automatically transferred and others needing user input before completing the transfer. For example, annotations to a page that is unchanged between the two versions may be automatically transferred from the original version to the revised version. In some embodiments, certain types of annotations may be automatically transferred, such as audio notes, while others, such as highlights, may require acceptance by a user before being transferred. In some embodiments, the active reader may be capable of changing the location of annotations, either automatically or with user input, to correspond to changes between the two versions of the document. For example, if a location of a line of text in the first document changes to a new location in the revised document, either to a different line or to a different page, the annotations associated with that location (e.g., the audio note after the line "also the leap into electronic" as shown in FIG. 27) may be moved to the new location. In some embodiments, the location may be changed automatically while in other embodiments, the user may be prompted to select a new location. In some embodiments, the active reader may provide suggestions for new locations for the user to choose, such as to the same location (i.e., same page and line) even if text has moved or to a new location (i.e., a new page or line). In some embodiments, all of the annotations from a previous version may be presented to a user and the user may select which annotations to transfer to the new version. In some embodiments, information about the annotations may be provided to the user to assist in the selection process, such as information about the annotations (e.g., date, time, type of annotation, thumbnail of annotations, summary of annotation) and/or an indication of whether any content within the page on which the annotation was located has changed.

One possible software design for implementing various principles of the invention includes an active reader document browser permitting a user to retrieve and view e-documents from a virtual library document storage area. The e-documents may be downloaded and stored locally on the user's device or they may be stored remotely and retrieved across a network such as the Internet. The active reader application retrieves and stores annotations in ink layers coupled to the pages of the e-document. One solution provides a way to separate the annotation information from the image information and at the same time attach or store the annotation information with the image file as vector-based text information. As with e-document storage, ink layer storage can be local or remotely located. For example, annotations can be saved locally as part of the file of the currently displayed page of the e-document or may be stored remotely in a separate file associated with the currently displayed page of the e-document.

The present invention contemplates a system and method that allows annotations to be captured in a non-raster format. Because the annotations are stored in a vector file that is linked to the image file, the annotation will travel with the image information. As used herein, a "vector image" or "vector information" means a graphic comprising shapes, curves, lines, and text which together make the image. Once the image has been annotated, the next step is to save the annotations and metadata, if present, as vector information linked to the image. The term linking, in addition to its normal meaning, also means, for the purposes of this application to save the vector information inside the image file itself or as a separate file. Some image formats allow the vector information to be saved inside of the image file itself. In accordance with the illustrative embodiments of the present invention, it is possible to store text information such as vector-based image annotations and metadata inside the image file alongside the actual image information. The metadata includes any additional information about the image or annotations that may be useful. For example, the metadata may include the names of persons adding annotations to the image, including the date and time that the annotations were performed.

While the vector information can be stored in any format, one method is to store the vector information in the XML format. Further, in accordance with the illustrative embodiments of the present invention, the output is not platform specific. Rather, the output format only requires a browser capable of displaying a JPEG image. Metadata that includes visual annotations, author information, and information related to the authoring sessions are stored within the file. This format facilitates cross-media distribution, extensibility, interactive web viewing, and reuse, and also allows the annotations to remain linked to the image, as opposed to embedding the annotations to the image. As can be seen, the annotations are "overlaid" over the original image. The annotations are not embedded in the original but are stored in a separate file that is linked to the image file such that the original image remains unedited and more importantly, no pixels of the original raster image were changed or edited.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit and scope of the invention.

What is claimed is:

1. A computer-implemented method of annotating pages of an electronic document, the computer-implemented method comprising:
    converting a source document in a first format into a first electronic document in a second format, wherein the converting comprises:
        generating a plurality of linked digital images corresponding to pages of the source document;

performing optical character recognition (OCR) on the plurality of linked digital images to generate a text file that includes recognized text corresponding to text included in the source document;

correlating the recognized text with corresponding locations in the digital images; and generating a plurality of transparent canvas layers, each transparent canvas layer being linked to a digital image of the plurality of digital images and being dimensioned such that the transparent canvas layer can be superimposed over the linked digital image when displayed;

providing the first electronic document to a user;

in response to a request from the user to view a page of the first electronic document, displaying on a computer display a first digital image corresponding to the page of the first electronic document overlaid with a first transparent canvas layer linked to the displayed first digital image;

detecting a selection of an annotation mode that permits the user to annotate the currently displayed first digital image;

receiving a first annotation input from a user input device indicating that the user has made a first annotation to the currently displayed first digital image;

storing the first annotation as a first object on the first transparent canvas layer, wherein the first transparent canvas layer containing the first annotation is stored in a first annotation file as a first canvas layer;

receiving a second annotation input from the user input device indicating that the user has made a second annotation to the currently displayed first digital image;

storing the second annotation as a second object on the first transparent canvas layer, wherein the first transparent canvas layer containing the first annotation and the second annotation is stored in a second annotation file as a second canvas layer;

in response to a request to view a different page of the first electronic document, displaying on the computer display a second digital image corresponding to the different page of the first electronic document overlaid with a second transparent canvas layer linked to the displayed second digital image and updating the plurality of transparent canvas layers such that the second canvas layer is linked to the first digital image and will be superimposed over the first digital image when displayed;

receiving a revised source document, wherein the revised source document is a newer version of the source document with modifications to content thereof;

converting the revised source document into a second electronic document in the second format, wherein the second electronic document comprises a second plurality of digital images and a second plurality of transparent canvas layers linked to the second plurality of digital images;

providing the second electronic document to the user;

upon determining that the second electronic document is a newer version of the first electronic document, checking the plurality of transparent canvas layers linked to the first electronic document for any annotations; and transferring at least a portion of the annotations from the plurality of transparent canvas layers linked to the first electronic document to the second plurality of transparent canvas layers.

2. The computer-implemented method of claim 1 and further comprising:

in response to a user request to undo the second annotation, removing the second canvas layer from the computer display and displaying the first canvas layer in the computer display.

3. The computer-implemented method of claim 1, wherein the source document is one of an HTML file, a PDF file, or a native word processing application file.

4. The computer-implemented method of claim 1, wherein the digital images are JPEG files and the transparent canvas layer is a bitmap image.

5. The computer-implemented method of claim 1, wherein the first annotation is one or more of an image annotation, a voice annotation, a video annotation, a structured text annotation, a free hand text annotation, a free hand sketch annotation, and an audio annotation.

6. The computer-implemented method of claim 1, wherein the first annotation file contains a user identifier associated with the user.

7. The computer-implemented method of claim 1, wherein in response to the request from the user to view the page of the first electronic document, the annotation database is checked for any annotation files associated with the user.

8. The computer-implemented method of claim 1, wherein at least a portion of the annotations are presented to the user for the user to select which annotations to transfer to the second plurality of transparent canvas layers.

9. The computer-implemented method of claim 1, wherein at least a portion of the annotations are automatically transferred to the second plurality of transparent canvas layers.

10. The computer-implemented method of claim 1 and further comprising:

receiving data from a device associated with the computer display, wherein the data includes a number of pages of the electronic document that have been displayed to the user and an amount of time each page was displayed to the user.

* * * * *